(12) United States Patent
Heubel et al.

(10) Patent No.: US 10,583,359 B2
(45) Date of Patent: Mar. 10, 2020

(54) SYSTEMS AND METHODS FOR PROVIDING HAPTIC EFFECTS RELATED TO TOUCHING AND GRASPING A VIRTUAL OBJECT

(71) Applicant: Immersion Corporation, San Jose, CA (US)

(72) Inventors: Robert Heubel, San Leandro, CA (US); Juan Manuel Cruz-Hernandez, Montreal (CA); Vahid Khoshkava, Montreal (CA); Sanya Attari, Fremont, CA (US); Colin Swindells, San Jose, CA (US); Satoshi Araki, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 100 days.

(21) Appl. No.: 15/856,233

(22) Filed: Dec. 28, 2017

(65) Prior Publication Data

US 2019/0201785 A1   Jul. 4, 2019

(51) Int. Cl.
*A63F 13/285* (2014.01)
*A63F 13/212* (2014.01)

(52) U.S. Cl.
CPC .......... *A63F 13/285* (2014.09); *A63F 13/212* (2014.09)

(58) Field of Classification Search
CPC .... G06F 3/014; G06F 3/016; G06F 2203/013; A63F 13/212; A63F 13/285
See application file for complete search history.

(56) References Cited

U.S. PATENT DOCUMENTS

| | | |
|---|---|---|
| 5,734,373 A | 3/1998 | Rosenberg |
| 7,109,970 B1 | 9/2006 | Miller |

(Continued)

FOREIGN PATENT DOCUMENTS

WO   2017/168186 A1   10/2017

OTHER PUBLICATIONS

The Extended European Search Report issued in European Application No. 18214447.7-1216, dated May 6, 2019.

*Primary Examiner* — Koosha Sharifi-Tafreshi
(74) *Attorney, Agent, or Firm* — Medler Ferro Woodhouse & Mills PLLC

(57) ABSTRACT

A wearable device for providing haptic effects includes a wearable housing configured to be worn on to a portion of a hand of a wearer and an actuator secured to the wearable housing. The wearable housing includes a first digit segment configured to conform to a finger of the hand and a second digit segment configured to conform to another finger or a thumb of the hand. The actuator is configured to receive a command signal indicative of a virtual interaction related to touching or grasping a virtual object. In response to the command signal, the actuator provides a force onto the portion of the hand or provides a force to render a resistance to movement of the first and second digit segments toward each other. The actuator uses the wearable housing to mechanically stabilize the force towards the portion of the hand. The wearable device may further include a sensor configured to sense a dynamic response to a user interaction with a real-world object which corresponds to the virtual object, the sensed dynamic response being used to assess a physical characteristic of the real-world object.

20 Claims, 17 Drawing Sheets

(56) References Cited

U.S. PATENT DOCUMENTS

| | | |
|---|---|---|
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |
| 9,851,799 B2 | 12/2017 | Keller et al. |
| 9,933,851 B2 | 4/2018 | Goslin et al. |
| 9,948,885 B2 | 4/2018 | Kurzweil |
| 2012/0182135 A1* | 7/2012 | Kusuura .................. G06F 3/00 340/407.1 |
| 2014/0104274 A1* | 4/2014 | Hilliges ................. G06F 3/011 345/424 |
| 2016/0054797 A1* | 2/2016 | Tokubo .................. G06F 3/012 345/633 |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0175711 A1 | 6/2016 | Billington et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0342207 A1 | 11/2016 | Beran |
| 2016/0363997 A1 | 12/2016 | Black et al. |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0262060 A1* | 9/2017 | Katsuki .................. G06F 3/038 |
| 2017/0322626 A1 | 11/2017 | Hawkes et al. |
| 2017/0352185 A1 | 12/2017 | Bonilla Acevedo et al. |
| 2017/0371416 A1* | 12/2017 | Zeitler .................... G06F 3/016 |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |
| 2018/0314334 A1* | 11/2018 | Appleyard .............. G06F 3/016 |
| 2018/0356893 A1* | 12/2018 | Soni ........................ G06F 3/016 |

* cited by examiner

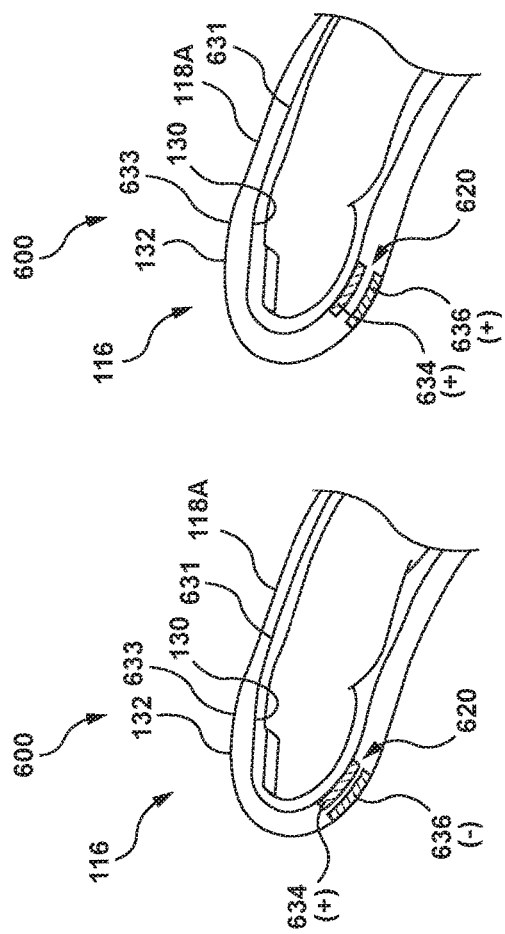
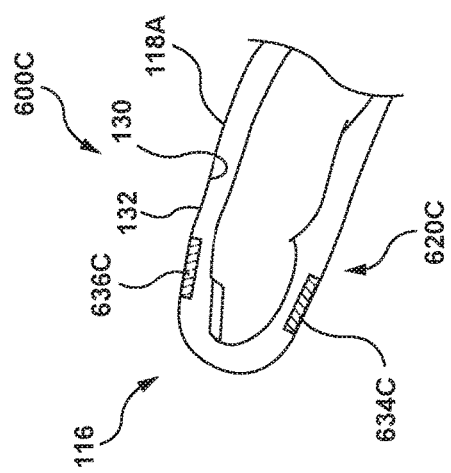
FIG. 6A
FIG. 6B
FIG. 6C

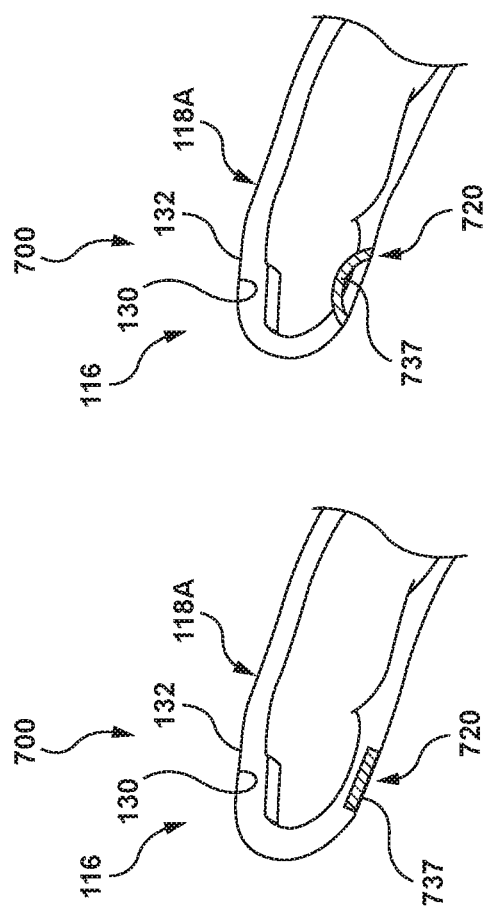
FIG. 7A
FIG. 7B
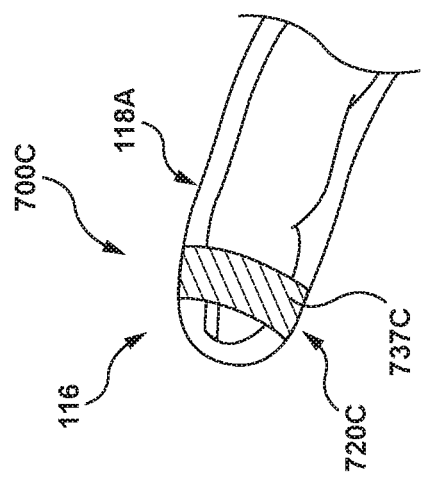
FIG. 7C

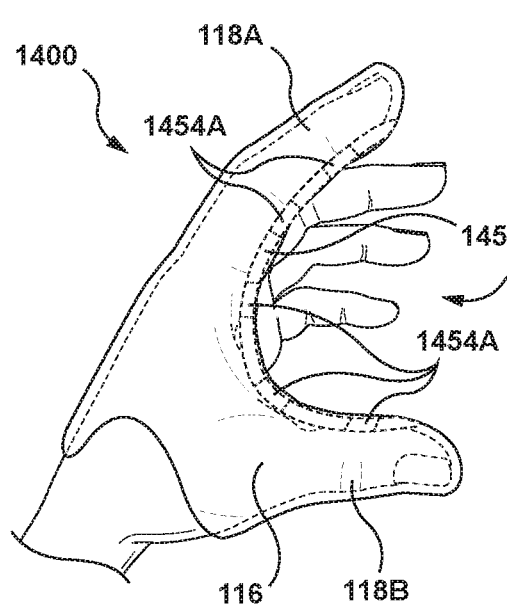
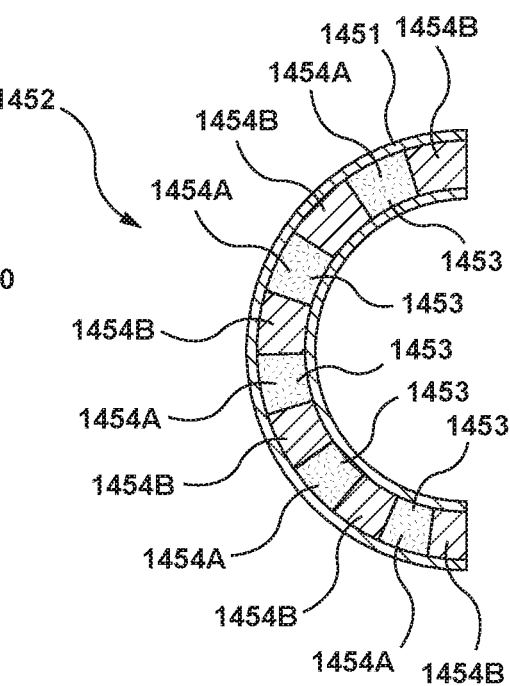
FIG. 14A
FIG. 14B

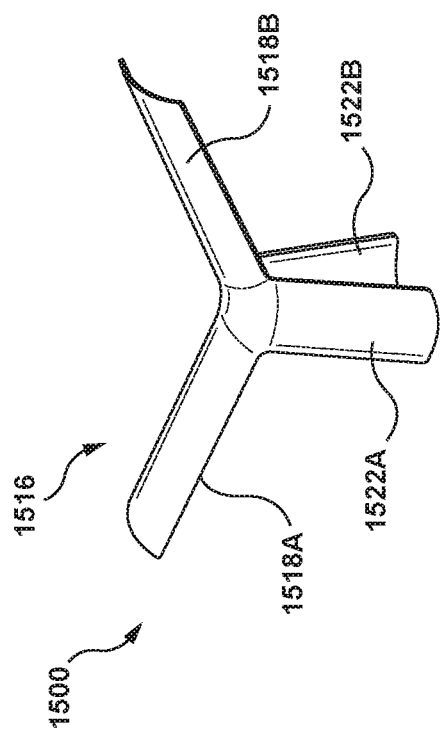
FIG. 15
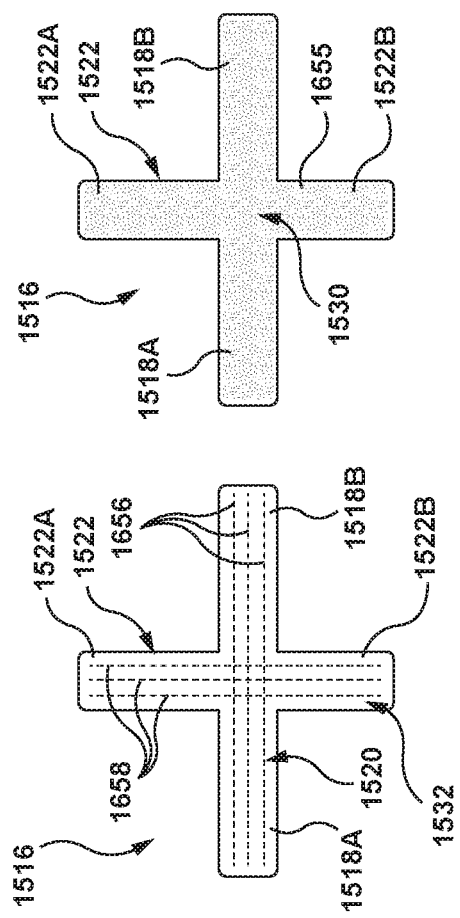
FIG. 16A
FIG. 16B

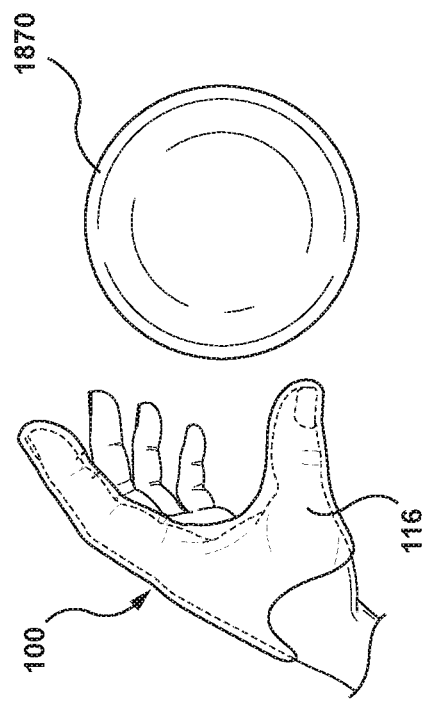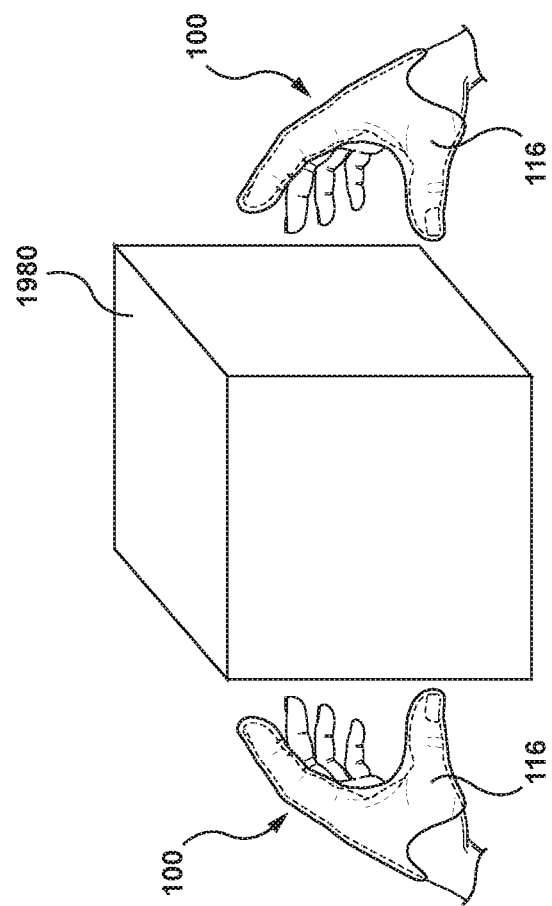

SYSTEMS AND METHODS FOR PROVIDING HAPTIC EFFECTS RELATED TO TOUCHING AND GRASPING A VIRTUAL OBJECT

FIELD OF THE INVENTION

Embodiments hereof relate to haptic effects and more particularly relate to haptic effects indicative of a virtual interaction related to touching and/or grasping a virtual object.

BACKGROUND OF THE INVENTION

Video games and video game systems have become even more popular due to the marketing toward, and resulting participation from, casual gamers. Conventional video game devices or controllers use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects". Haptic feedback can provide cues that enhance and simplify the user interaction or user experience. Specifically, vibration effects, or vibrotactile haptic effects, may be useful in providing cues to users of electronic devices to alert the user to specific events, or provide realistic feedback to create greater sensory immersion within a simulated or virtual environment. Conventional haptic feedback systems for gaming, virtual reality, augmented reality, and other devices generally include one or more actuators attached to or contained within the housing of a hand-held controller/peripheral for generating haptic feedback. Embodiments hereof relate to one or more actuators attached to or contained within a wearable device for generating haptic feedback.

BRIEF SUMMARY OF THE INVENTION

Embodiments hereof are directed to a wearable device for providing haptic effects. The wearable device includes a wearable housing configured to be worn on no more than three digits of a hand of a wearer. The wearable housing includes a first digit segment configured to conform to a finger of the hand, a second digit segment configured to conform to another finger or a thumb of the hand, and an anchor disposed to extend between the first digit segment and the second digit segment. The anchor is saddle shaped to extend from a dorsal side to a ventral side of the hand. The wearable device also includes an actuator secured to the wearable housing. The actuator is configured to receive a command signal indicative of a virtual interaction related to grasping a virtual object and provide a force, in response to the command signal, to render a resistance to movement of the first digit segment of the wearable housing toward the second digit segment of the wearable housing, and vice versa. The actuator uses the anchor of the wearable housing to mechanically stabilize the force towards the hand.

In an embodiment, the anchor of the wearable housing includes a ventral flap configured to be disposed over a portion of a ventral surface of a hand and a dorsal flap configured to be disposed over a portion of a dorsal surface of the hand.

In an embodiment, the anchor mechanically stabilizes the wearable housing relative to a hand by conforming to the hand.

In an embodiment, the actuator is formed from a smart material and a stiffness of the actuator is varied to provide the force in response to the command signal.

In an embodiment, the actuator extends exterior to the wearable housing and includes at least one strand or coil having a first end secured to the first digit segment of the wearable housing and a second opposing end secured to the second digit segment of the wearable housing. In an embodiment, the at least one strand or coil of the actuator includes a first strand formed from a smart material that is deformable in response to the command signal, the first strand having the first end secured to the first digit segment of the wearable housing and the second opposing end secured to the second digit segment of the wearable housing, and a second strand formed from a smart material that is deformable in response to the command signal, the second strand having a first end secured to a third digit segment of the wearable housing and a second opposing end secured to the second digit segment of the wearable housing.

In an embodiment, the actuator includes a shell and the smart material is a metal disposed within the shell, the metal having a liquid state and a solid state in response to the command signal.

In an embodiment, the actuator extends interior to the wearable housing and conforms to the first digit segment of the wearable housing and the second digit segment of the wearable housing. The actuator includes a shell and the smart material is a metal disposed within the shell, the metal having a liquid state and a solid state in response to the command signal. In an embodiment, the shell includes a plurality of interior compartments and the smart material is disposed only in interior compartments of the plurality of interior compartments that are positioned to be disposed adjacent to joints of the hand.

In an embodiment, the wearable device further includes at least one sensor secured to the wearable housing and configured to sense a dynamic response to a user interaction with a real-world object which corresponds to the virtual object. The dynamic response is used to assess a physical characteristic of the real-world object, the physical characteristic being at least one of a size, a shape, a stiffness, a weight, a thermal feature, or a texture of the real-world object. The virtual interaction is a tactile characteristic of the virtual object, the tactile characteristic being at least one of a size, a shape, a stiffness, a weight, a thermal feature, or a texture of the virtual object and corresponding to the physical characteristic of the real-world object.

In an embodiment, each of the first digit segment and the second digit segment is a tubular component with a closed tip end and having an end that is disposed at the anchor.

In an embodiment, the wearable housing is configured to be worn on only two digits of a hand, the first digit segment being configured to conform to a finger of the hand and the second digit segment being configured to conform to a thumb of the hand.

In another embodiment hereof, a system for providing haptic effects includes a first wearable housing configured to be worn on a portion of a first hand of a wearer, a first sensor secured to the first wearable housing, a second wearable housing configured to conform to a portion of a second hand of a wearer, a second sensor secured to the second wearable housing, and an actuator secured to the first wearable housing. The first wearable housing includes a first digit segment configured to conform to a finger of the first hand and a second digit segment configured to conform to another finger or a thumb of the first hand. The second wearable housing includes a first digit segment configured to conform to a finger of the second hand and a second digit segment configured to conform to another finger or a thumb of the second hand. The first sensor and the second sensor are configured to collectively sense a dynamic response to a user interaction with a real-world object. The dynamic response is used to assess a physical characteristic of the real-world object, the physical characteristic being at least one of a size, a shape, a stiffness, a weight, a thermal feature, or a texture of the real-world object. The actuator is configured to receive a command signal indicative of a virtual interaction related to grasping a virtual object that corresponds to the real-world object, and provide a force, in response to the command signal, to render a resistance to movement of the first digit segment of the first wearable housing toward the second digit segment of the first wearable housing.

In another embodiment hereof, a wearable device for providing haptic effects includes a wearable housing configured to be worn on no more than three digits of a hand of a wearer and an actuator secured to the wearable housing. The wearable housing includes a first digit segment configured to conform to a finger of the hand, a second digit segment configured to conform to another finger or a thumb of the hand, and an anchor disposed to extend between the first digit segment and the second digit segment. The anchor is saddle shaped to extend from a dorsal side of the hand to a ventral side of the hand. The actuator is configured to receive a command signal indicative of a virtual interaction related to touching a virtual object, and provide a force onto the portion of the hand in response to the command signal. The actuator uses the anchor of the wearable housing to mechanically stabilize the force towards the hand.

In an embodiment, the actuator is secured to at least one the digit segment of the wearable housing.

In an embodiment, the actuator includes a smart material that is deformable in response to the command signal.

In an embodiment, the actuator is secured to a portion of the at least one the digit segment configured to contact a ventral side of a finger of the wearer.

In an embodiment, the actuator is secured to the at least one the digit segment such that the actuator surrounds a finger of the wearer.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 6A is a schematic illustration of a first digit segment of a wearable device according to an embodiment hereof, wherein an actuator is secured to the first digit segment of the wearable device and the actuator includes a first magnet and a second magnet, the first magnet and the second magnet being shown in a first configuration in which they attract each other.

FIG. 6B is another schematic illustration of the first digit segment according to the embodiment of FIG. 6A, wherein the first magnet and the second magnet are shown in a second configuration in which they repel each other.

FIG. 6C is a schematic illustration of the first digit segment according to an alternative of the embodiment of FIG. 6A, wherein the first magnet and the second magnet are secured to the wearable device so as to be positioned on opposing sides of a wearer's finger.

FIG. 7A is a schematic illustration of a first digit segment of a wearable device according to another embodiment hereof, wherein an actuator is secured to the first digit segment of the wearable device and the actuator includes a segment of smart material that is deformable in response to a command signal, the segment of smart material being shown in a first configuration in which it is not deformed.

FIG. 7B is another schematic illustration of the first digit segment according to the embodiment of FIG. 7A, wherein the segment of smart material is shown in a second configuration in which it is deformed.

FIG. 7C is a schematic illustration of the first digit segment according to an alternative of the embodiment of FIG. 7A, wherein the smart material is shaped as a band so as to surround a wearer's finger.

FIG. 14A is a schematic illustration of a wearable device according to an embodiment hereof, wherein an elongated member extends interior to the wearable device and conforms to a first digit segment of the wearable device and a second digit segment of the wearable device, the elongated member including a shell having a plurality of interior compartments and a smart material that is disposed only in interior compartments that are positioned to be disposed adjacent to joints of the hand.

FIG. 14B is a sectional view of the elongated member of FIG. 14A, wherein the elongated member is removed from the wearable device for sake of illustration only.

FIG. 15 is a schematic illustration of a wearable device for providing haptic effects according to another embodiment hereof, wherein the wearable device includes a first digit segment configured to conform to a ventral surface of a finger of the wearer's hand, a second digit segment configured to conform to a ventral surface of a thumb of the wearer's hand, and an anchor disposed between the first digit segment and the second digit segment, the anchor being configured to extend from a dorsal side of the hand to a ventral side of the hand.

FIG. 16A is a schematic illustration of an outer surface of the wearable device according to the embodiment of FIG. 15, wherein the outer surface is configured to be spaced apart from the skin of a wearer's hand and the outer surface includes an actuator configured to render a resistance to movement of the first digit segment toward the second digit segment, and vice versa.

FIG. 16B is a schematic illustration of an inner surface of the wearable device according to the embodiment of FIG. 15, wherein the inner surface is configured to contact the skin of a wearer's hand.

FIG. 18 is a schematic illustration of the wearable device of FIG. 1 according to an embodiment hereof, the wearable device being shown in close proximity to a real-world object, wherein the wearable device includes at least one sensor for assessing a physical characteristic of the real-world object.

FIG. 19 is a schematic illustration of a first wearable device and a second wearable device according to an embodiment hereof, the first and second wearable devices being shown in close proximity to a real-world object, wherein the first and second wearable devices each include at least one sensor for assessing a physical characteristic of the real-world object.

DETAILED DESCRIPTION OF THE INVENTION

Figure 1:
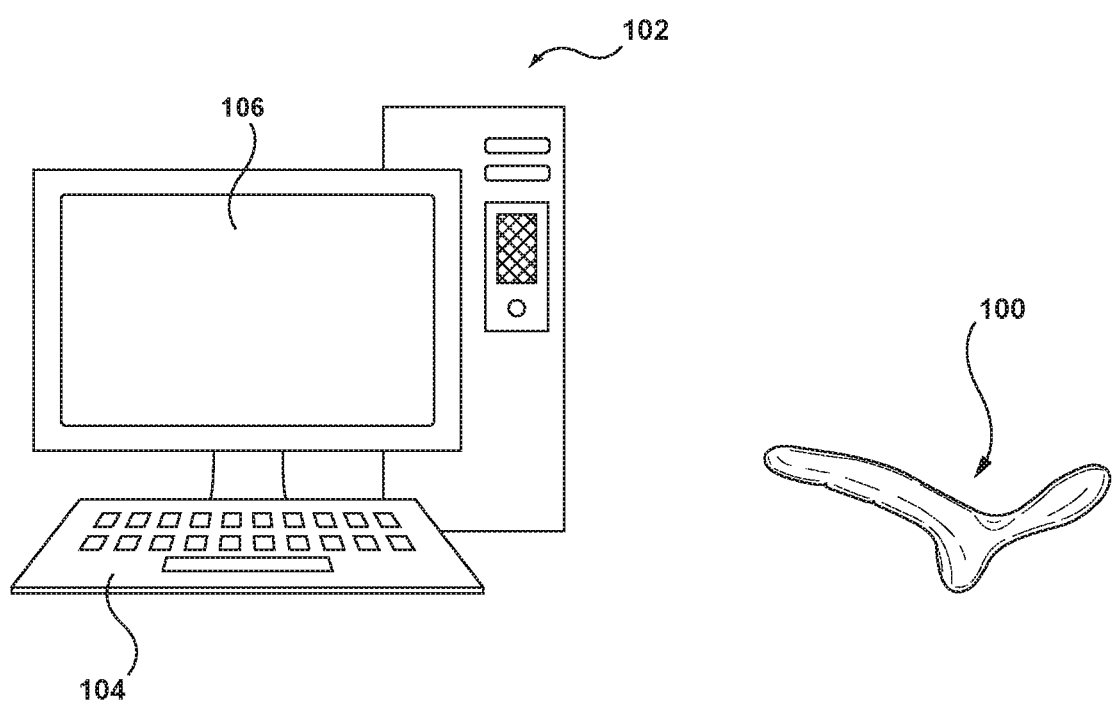
FIG. 1 is a schematic illustration of a system including a wearable device for providing haptic effects according to an embodiment hereof, wherein the system also includes a host computer.

Specific embodiments of the present invention are now described with reference to the figures, wherein like reference numbers indicate identical or functionally similar elements. The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although the following description is directed to wearable devices for receiving feedback in a virtual reality (VR) or augmented reality (AR) environment, those skilled in the art would recognize that the description applies equally to other haptic feedback devices and applications.

Embodiments hereof are directed to a wearable device for providing haptic effects related to touching and/or grasping virtual objects in a virtual reality or augmented reality environment. The wearable device includes a wearable housing configured to be worn on a portion of a hand of a wearer and an actuator secured to the wearable housing. In order to provide haptic effects related to touching virtual objects in a virtual reality or augmented reality environment, the actuator receives a command signal indicative of a virtual interaction related to touching a virtual object, and provides a force onto the portion of the hand in response to the command signal. In embodiments hereof related to touching virtual objects, actuators described herein thus, for example, provide a force onto a wearer's fingertip to simulate the sensation of touching a virtual object. The actuator uses the wearable housing to mechanically stabilize the force towards a portion of the hand, as described in more detail herein. In order to provide haptic effects related to grasping virtual objects in a virtual reality or augmented reality environment, the actuator is configured to receive a command signal indicative of a virtual interaction related to grasping a virtual object, and provide a force, in response to the command signal, to render a resistance to movement between the digit segments of the wearable housing. In embodiments hereof related to grasping virtual objects, actuators described herein thus prevent or impede bending of a wearer's fingers to simulate the sensation of grasping virtual objects. In addition, current non-kinesthetic effects related to virtual reality or augmented reality interactions such as vibrational haptic effects may cause user fatigue since the user is required to keep his hand positioned on a peripheral in order to perceive such haptic effects. In embodiments hereof, kinesthetic or tactile haptic responses to virtual objects are created on the wearable device in mid-air and thus user fatigue is prevented and/or reduced.

Figure 2:
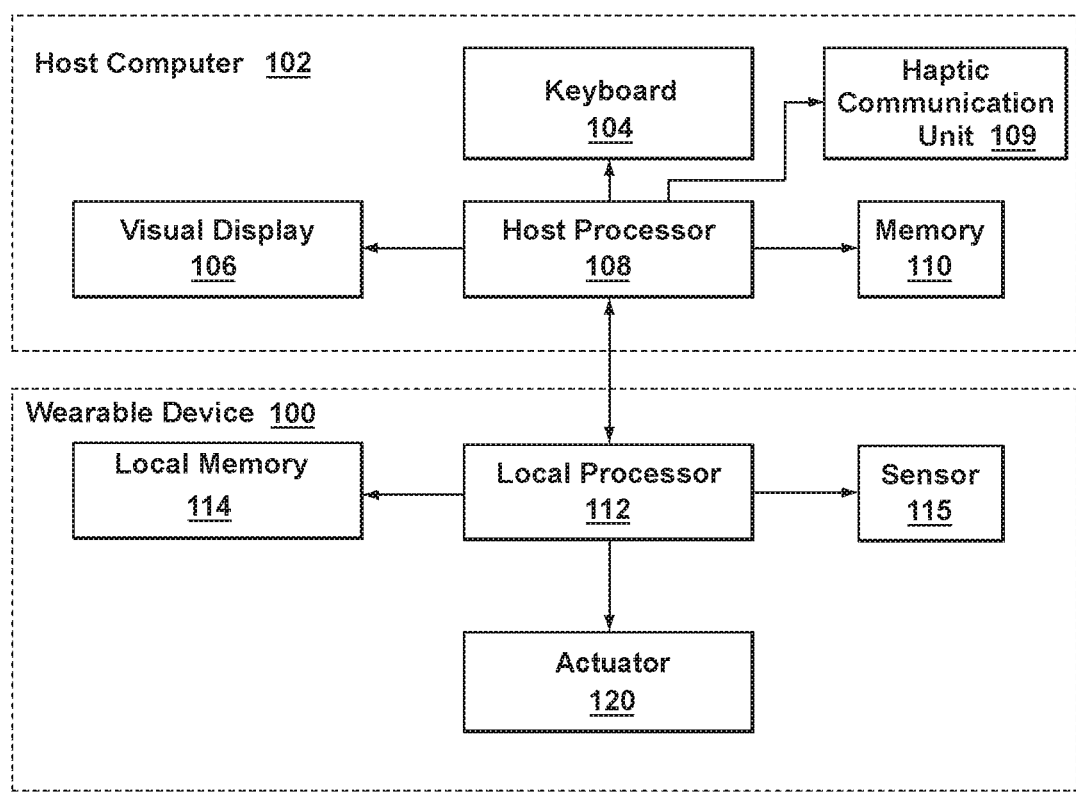
FIG. 2 is a block diagram of the system of FIG. 1.

FIG. 1 is a schematic illustration of a system including a wearable device 100 for providing haptic effects according to an embodiment hereof, wherein the system also includes a host computer 102 having a keyboard 104 and a visual display 106. FIG. 2 is a block diagram of the system of FIG. 1. The host computer 102 is configured to generate a virtual environment on the visual display 106. The host computer 102 preferably runs one or more host application programs with which a user is interacting via peripherals, such as but not limited to the keyboard 104. Although shown as a desktop computer in FIG. 1, the host computer 102 consistent with the present invention may be configured as a gaming console, a handheld gaming device, a laptop computer, a smartphone, a tablet computing device, a television, an interactive sign, and/or other device that can be programmed to provide a command signal. As shown on the block diagram of FIG. 2, the host computer 102 also includes a host processor 108, a memory 110, a haptic communication unit 109, and/or other components. The host computer 102 may include, for example, a component for providing audio feedback to the user. The host processor 108 may be programmed by one or more computer program instructions to carry out methods described herein. More particularly, the host processor 108 may execute a software application that is stored in the memory 110 or another computer-readable or tangible medium. As used herein, for convenience, the various instructions may be described as performing an operation, when, in fact, the various instructions program the host processor 108 to perform the operation. In other embodiments, the functionality of the host processor 108 may be performed by hardware (e.g., through the use of an application specific integrated circuit ("ASIC"), a programmable gate array ("PGA"), a field programmable gate array ("FPGA"), etc.), or any combination of hardware and software. The host processor 108 may be any type of general purpose processor, or could be a processor specifically designed to provide haptic effect signals. The host processor 108 may be the same processor that operates the entire the host computer 102, or may be a separate processor. The host processor 108 can decide what haptic effects to send to the wearable device 100 and in what order to send the haptic effects. The memory 110 may be any type of storage device or computer-readable medium, such as but not limited to random access memory (RAM), read only memory (ROM), flash memory, and/or any other memory suitable for storing software instructions. The memory 110 may store the computer program instructions (e.g., the aforementioned instructions) to be executed by the host processor 108 as well as data that may be manipulated by the host processor 108.

The host computer 102 is coupled to the visual display 106 via wired or wireless means. The visual display 106 may be any type of medium that provides graphical information to a user, including but not limited to monitors, television screens, plasmas, LCDs, projectors, or any other display devices. In an embodiment, the host computer 102 is a gaming device console and the visual display 106 is a monitor which is coupled to the gaming device console, as known in the art. In another embodiment, the host computer 102 and the visual display 106 may be combined into a single device. A user interacts with the visual display 106 by touching the keyboard 104 to activate, move, flip, advance, or otherwise manipulate the virtual graphical objects displayed on the visual display 106 and thereby to provide inputs to the host computer 102. Further, as will be understood by one of ordinary skill in the art, alternative user input elements may be provided in addition to or as an alternative to the keyboard 104 to permit a user to interact with the visual display 106. The user input elements may include any elements suitable for accepting user input such as buttons, switches, dials, levers, touchscreens, and the like. The user input elements may further include peripherally connected devices, such as mice, joysticks, game controllers, keyboards, and the like. Movements of the user input elements may provide the host computer 102 with input corresponding to the movement of a computer generated graphical object, such as a cursor or other image, or some other graphical object displayed by the host computer 102 via visual display 106, or to control a virtual character or gaming avatar, such as a person, vehicle, or some other entity that may be found in a game or computer simulation.

The haptic communication unit 109 of the host computer 102 may include any connection device, wired or wireless, that may transmit or communicate a command signal from the host processor 108 to an actuator 120 associated with the wearable device 100, which will be described in more detail below. In some implementations, the haptic communication unit 109 may be a dedicated unit configured solely for delivering a command signal. In some implementations, the haptic communication unit 109 may further function to deliver a myriad of other communications, wired or wirelessly, to another external device such as the keyboard 104, a hand-held controller (not shown), and/or other peripheral devices. In the embodiment shown in FIGS. 1 and 2, the haptic communication unit 109 is in communication with the wearable device 100 using wireless communication means known to those of skill in the art. This can include but is not limited to BLUETOOTH® antennas, WI-FI® antennas, cellular antennas, infrared sensors, optical sensors, and any other device configured to receive and/or transmit information wirelessly. Further, the host computer 102 may be in the cloud and thus is not required to be wired or connected wirelessly in a local fashion. However, in other embodiments, the wearable device 100 may communicate with the host computer 102 through wired communication ports, such as USB ports, HDMI® ports, A/V ports, optical cable ports, and any other component or device configured to receive or send information in a wired fashion.

As shown in the block diagram of FIG. 2, the wearable device 100 may include a local processor 112, a local memory 114, at least one actuator 120, and at least one sensor 115. The sensor 115 is described in more detail herein with respect to FIGS. 17-19. As used herein, the actuator 120 is utilized to generically refer to any embodiment of actuator described herein for use with the wearable device 100. In operation, the local processor 112 is coupled to the actuator 120 to provide command signals thereto based on high level supervisory or streaming commands from the host computer 102. For example, when in operation, magnitudes and durations are streamed from the host computer 102 to the wearable device 100 where information is provided to the actuator 120 via local processor 112. The host computer 102 may provide high level commands to the local processor 112 such as the type of haptic effect to be output by the actuator 120, whereby the local processor 112 instructs the actuator 120 as to particular characteristics of the haptic effect which is to be output (e.g. magnitude, frequency, duration, etc. such that haptic effects may feel bumpy, soft, hard, mushy, etc.). The local processor 112 may retrieve the type, magnitude, frequency, duration, or other characteristics of the haptic effect from the local memory 114 coupled thereto. In addition, similar to the memory 110 of the host computer 102, the local memory 114 can be any type of storage device or computer-readable medium, such as but not limited to random access memory (RAM) or read-only memory (ROM). The local memory 114 may also be located internal to the local processor 112, or any combination of internal and external memory. Similar to the host processor 108, the local processor 112 also can decide what haptic effects to send and what order to send the haptic effects. Time critical processing is preferably handled by the local processor 112, and thus the local processor 112 is useful to convey closed-loop haptic feedback with high update rates (e.g., 5-10 kHz). In another embodiment hereof, the wearable device 100 is configured to not include the local processor 112, whereby all input/output signals from the wearable device 100 are handled and processed directly by the host computer 102.

Figure 3A:
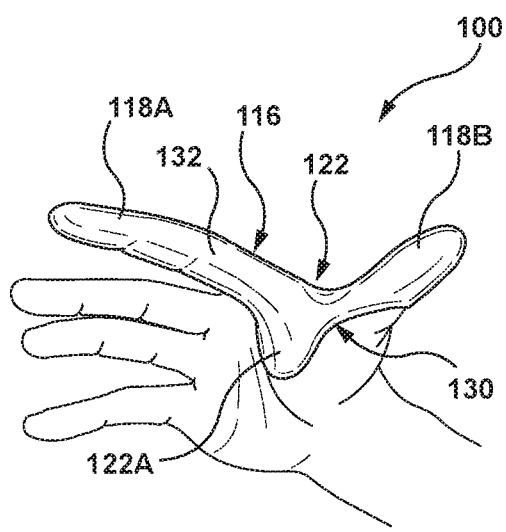
FIG. 3A is a perspective view of the wearable device of FIG. 1, wherein the wearable device is disposed on a portion of a wearer's hand and the wearable device includes a first digit segment configured to conform to a finger of the wearer's hand and a second digit segment configured to conform to a thumb of the wearer's hand.
Figure 3B:
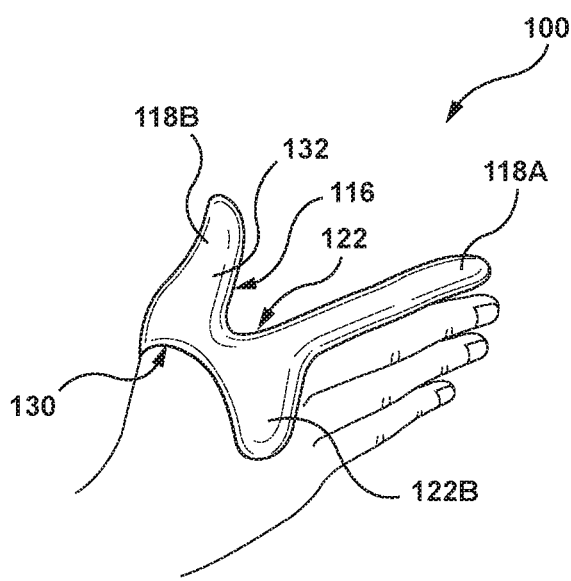
FIG. 3B is another perspective view of the wearable device of FIG. 1.

Turning to FIGS. 3A and 3B, the structure of the wearable device 100 will now be described in more detail. The wearable device 100 includes a wearable housing 116. As shown on FIGS. 3A and 3B, the wearable housing 116 includes at least a first digit segment 118A and a second digit segment 118B. In the embodiment of FIGS. 3A and 3B, each of the first and second digit segments 118A, 118B is a tubular component with a closed tip end and having an end that is disposed at an anchor 122 that connects and extends between the first and second digit segments 118A, 118B, as described below. As also described below first and second digit segments 118A, 118B are configured to surround or encircle at least a portion of a finger and thumb, respectively, of a hand. Further, in the embodiment of FIGS. 3A and 3B, the second digit segment 118B is configured to conform to a thumb of the hand but in another embodiment hereof, the second digit segment may conform to another finger of the hand. However, as opposed to a traditional glove with five digit segments extending from a base which extends over a palm of a hand, the wearable housing 116 is configured to fit a majority of hand shapes and sizes with little or no modifications, because the anchor 122 sits upon and conforms to a web of the wearer's hand (i.e., the skin between the first and second digit segments 118A, 118B) without having to be of a particular size or shape. Stated another way, the anchor 122 has an adjustable nature described in more detail below such that the anchor 122 is configured to fit a majority of hand shapes and sizes. In addition, the wearable housing 116 has a simple design that allows for easy attachment and easy removal from a wearer's hand since the wearable housing 116 only has two digit segments, i.e., the first and second digit segments 118A, 118B, that need to be positioned on the wearer's hand. Further, the wearable housing 116 is configured to be less obtrusive than a traditional glove during use to enable wearers to interact with their physical world in a relatively uninhibited manner while still providing kinesthetic haptic feedback interactions. Thus, in an embodiment, the wearable housing 116 is configured to be worn on only two digits of a hand of a wearer.

The wearable housing 116 is formed from any suitable material that is configured to conform and attach to a wearer's hand, including but not limited to LYCRA®, cotton, or similar fabrics that allow the skin to breath. As used herein, the term "conform" means that the wearable housing 116 or at least a portion thereof (i.e., a portion of the wearable housing which includes the actuator 120 secured thereto) assumes the same shape, outline, or contour of the underlying anatomy of a wearer such that the wearable housing 116 maintains consistent and close contact with the wearer's skin adjacent thereto. Stated another way, the wearable housing 116 or at least a portion thereof (i.e., a portion of the wearable housing which includes the actuator 120 secured thereto) is tight fitting for constant and close contact with the wearer's underlying finger and/or thumb. Such conformability is required in order for tactile haptic effects that are rendered by the actuator 120 to be perceived or felt by the wearer. The wearable housing 116 includes an inner surface 130 that forms an interior of the wearable device 100 and an outer surface 132 that forms an exterior of the wearable device 100. The inner surface 130 is configured to contact the skin of a wearer and conform thereto. In an embodiment, the inner surface 130 may include a layer of an elastic polymer material such as but not limited to silicone polymer in order to provide the inner surface 130 with tackiness and ensure a relatively high degree of friction between the wearable housing 116 and the skin of the wearer. In some implementations, the wearable housing 116 is a single layer of material having the inner surface 130 and the outer surface 132. In some implementations, however, the wearable housing 116 is two layers of material, with the inner surface 130 being formed from an inner surface of the inner layer of material and the outer surface 132 being formed from an outer surface of the outer layer of material. The inner layer of material may be considered a liner.

The wearable housing 116 further includes an anchor 122. The anchor 122 is disposed to extend between the first digit segment 118A and the second digit segment 118B. The anchor 122 is saddle-shaped with a ventral flap 122A and a dorsal flap 122B such that anchor 122 is configured to extend from a dorsal side of the hand to a ventral side of the hand as collectively shown in FIGS. 3A and 3B. More particularly, the ventral flap 122A is configured to be disposed over a portion of the ventral surface of the wearer's hand as shown in FIG. 3A and the dorsal flap 122B is configured to be disposed over a portion of the dorsal surface of the wearer's hand as shown in FIG. 3B, and the adjustable nature of the flap arrangement is configured to fit a majority of hand shapes and sizes with little or no modifications. In the embodiment of FIGS. 3A and 3B, each of the ventral and dorsal flaps 122A, 122B has a free end or edge that is not connected to any other part of the wearable housing 116. The anchor 122 functions to mechanically stabilize the wearable housing 116 relative to the hand of the wearer. As used herein, the term "mechanically stabilize" means that the wearable housing 116 or at least a portion thereof (i.e., the anchor 122) is substantially fixed and immovable with respect to a point on a wearer (i.e., a wearer's hand). Such mechanical stabilization is required in order for tactile haptic effects that are rendered by the actuator 120 to be perceived or felt by the wearer. The anchor 122 mechanically stabilizes the wearable housing 116 relative to a hand by conforming to the hand of the wearer. More particularly, the anchor 122 mechanically stabilizes the wearable housing 116 relative to the hand of the wearer by conforming to a wearer's skin that extends between the first digit segment 118A and the second digit segment 118B, by conforming to a wearer's skin along a dorsal side of the hand, by conforming to a wearer's skin along a ventral side of the hand, or through a combination of these methods. In an embodiment, the ventral and dorsal flaps 122A, 122B of the anchor 122 may include a spring material embedded therein to bias the ventral and dorsal flaps 122A, 122B towards the wearer's hand.

Figures 4A, 4B:
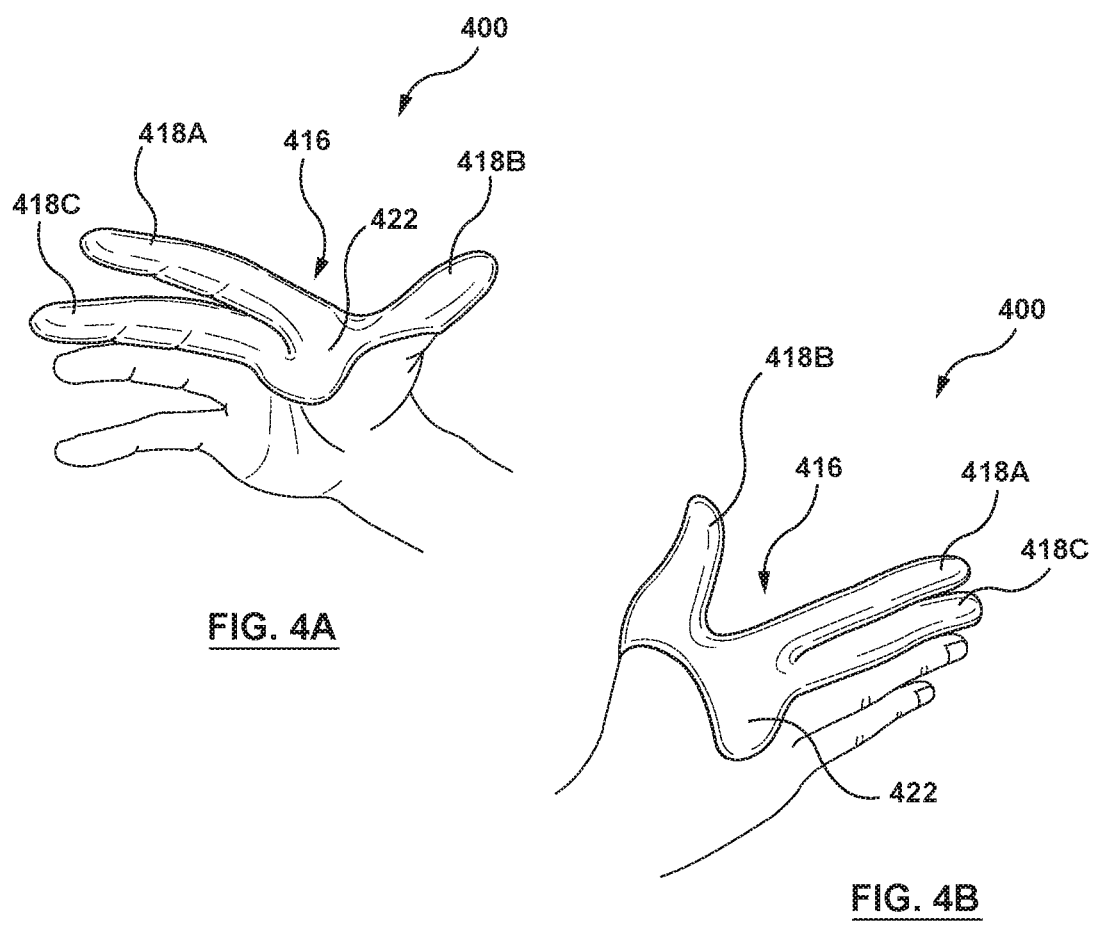
FIG. 4A is a perspective view of a wearable device for providing haptic effects according to another embodiment hereof, wherein the wearable device is disposed on a portion of a wearer's hand and the wearable device includes a first digit segment configured to conform to a first finger of the wearer's hand, a second digit segment configured to conform to a thumb of the wearer's hand, and a third digit segment configured to conform to a third finger of a wearer's hand.
FIG. 4B is another perspective view of the wearable device of FIG. 4A.

FIGS. 4A and 4B illustrate another embodiment of a wearable device 400 having a wearable housing 416. The wearable housing 416 includes at least a first digit segment 418A, a second digit segment 418B, and a third digit segment 418C. In the embodiment of FIGS. 4A and 4B, each of first, second, and third digit segments 418A, 418B, 418C is a tubular component that is configured to surround or encircle at least a portion of a finger or thumb of the hand. In the embodiment of FIGS. 4A and 4B, the third digit segment 418C is configured to surround and conform to a middle finger of the hand but in another embodiment hereof, the third digit segment may conform to another finger of the hand. The addition of the third digit segment 418 provides an additional location for an actuator for providing haptic feedback. In addition, although the wearable housing 416 includes an anchor 422 which is similar to the anchor 122 described above, the third digit segment 418 may assist the anchor 422 to mechanically stabilize the wearable housing 416 relative to the hand of the wearer. Thus, in this embodiment, the wearable housing 416 is configured to be worn on no more than three digits of a hand of a wearer. Although the wearable housing 416 is shown with three digit segments in total, it will be understood that further embodiments include a wearable housing with four digit segments in total as well as a wearable housing with five digit segments in total that resembles a traditional glove.

Referring back to FIG. 2, the wearable device 100 further includes at least one actuator 120. The actuator 120 is configured to receive a command signal from the host processor 108 and/or the local processor 112 that is indicative of a virtual interaction. In response to the command signal, the actuator 120 provides a force to simulate either touching or grasping of a virtual object, as will be described in more detail herein with respect to specific embodiments of actuators 120. A user interacting with a system, for example, a virtual reality system, an augmented reality system, or a conventional display system, may thus wear the wearable device 100 to improve the immersive experience. Via actuator 120, the wearable device 100 is configured to provide tactile force feedback to the wearer thereof, providing either resistance to make it difficult to bend the hand inside the wearable device 100 to simulate grasping a virtual object and/or rendering force to the hand inside the wearable device 100 to simulate touching a virtual object. The wearable device 100 is configured with at least one actuator 120, and placement of the actuator 120 depends upon the targeted regions of the hand for haptic feedback. Depending upon the specific embodiment, the actuator 120 may be positioned on the wearable housing 116 such that the actuator 120 contacts one or more tips of a digit of a wearer, one or more joints of a digit of a wearer, a ball of a thumb of a wearer, a web of a hand of a wearer, and/or a palm of a hand of a wearer.

Figure 5:
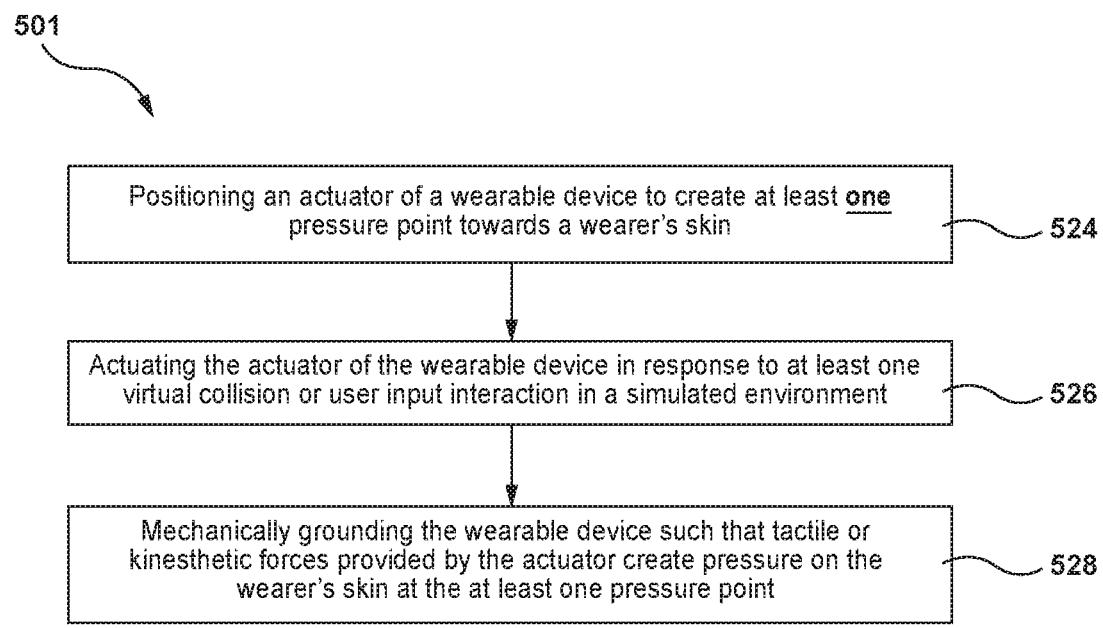
FIG. 5 is a flow chart that depicts providing a haptic effect indicative of a virtual interaction related to touching a virtual object with a wearable device in accordance with an embodiment hereof.

FIG. 5 is a flow chart depicting a process 501 for providing a haptic effect indicative of a virtual interaction related to touching a virtual object with a wearable device in accordance herewith. For instance, the wearable device 100, via actuator 120, is configured to provide tactile force feedback to a wearer thereof by providing force to at least a portion of a hand of the wearer that is disposed inside the wearable device 100 to simulate touching a virtual object. When simulating touching a virtual object, the actuator 120 is configured to and positioned on the wearable housing 116 so as to create at least one pressure point onto or towards the wearer's skin at a fingertip, thumb, or other portion of the hand as represented by step 524. Actuation of the actuator 120 is triggered or applied in response to at least one virtual collision or user input interaction in a simulated environment, such as a virtual reality environment or an augmented reality environment, as represented by step 526. More particularly, the host processor 108 of the host computer 102 and/or the local processor 112 of the wearable device 100 is configured to output a command signal to the actuator 120 in response to at least one virtual collision or user input interaction. The actuator 120 includes circuitry that receives signals from the host processor 108 and/or the local processor 112 of the wearable device 100. The actuator 120 may also include any circuitry required to convert the command signal from the processor(s) to an appropriate signal for use with the actuator 120. The actuator 120 provides a force onto the corresponding portion of the hand in response to the command signal to provide haptic feedback to a wearer of the wearable device 100. Such haptic feedback allows for a more intuitive, engaging, and natural experience for the wearer of the wearable device 100. When simulating touching a virtual object, the tactile forces rendered by the actuator 120 toward the wearer's skin create pressure on the wearer's skin at the at least one pressure point as shown in step 528. Such tactile forces may be perceived or felt by the wearer due to the fact that the wearable housing 116 is mechanically stabilize as described above. As used herein, the term "pressure point" refers to a portion or area on the wearer's skin that receives the tactile forces rendered by the actuator 120.

In an embodiment hereof illustrated in FIGS. 6A and 6B, a wearable device 600 includes the wearable housing 116 and an actuator 620. In this embodiment, the wearable housing 116 includes two layers of material, with the inner surface 130 being formed from an inner surface of an inner layer 631 of material and the outer surface 132 being formed from an outer surface of an outer layer 633 of material. The inner layer 631 of material will also be referred to herein as the liner 631. The actuator 620 is configured to simulate touching a virtual object and includes a first magnet 634 and a second magnet 636. Actuator 620 is secured to the first digit segment 118A. In this embodiment, the first magnet 634 is secured to an outer surface of the liner 631 and the second magnet 636 is secured to an inner surface of the outer layer 633 of the wearable housing 116. In FIG. 6A, the first and second magnets 634, 636 are shown in a first configuration in which they are of opposite polarities and thus attract each other, thereby simulating touching a virtual object. When the first and second magnets 634, 636 attract to each other, a click resulting from the contact between the first and second magnets 634, 636 is perceived by the wearer. In FIG. 6B, the first and second magnets 634, 636 are shown in a second configuration in which they are of the same polarity and thus repel each other, thereby simulating not touching a virtual object. When the first and second magnets 634, 636 repel each other, the first and second magnets 634, 636 are spaced apart. Further, the actuator 620 may be driven in an oscillation mode in which the first and second magnets 634, 636 are transitioned between the first and second configurations described above in order to generate haptic effects that are perceived by the wearer. Stated another way, movement of the first and second magnets 634, 636 is a haptic effect that is tactilely perceptible through the wearable housing 116.

In order to selectively attract or repel each other as described above for simulating touching a virtual object, at least one of the first magnet 634 and the second magnet 636 is an electromagnet. For sake of illustration purposes, the first magnet 634 is described herein as a conventional magnet having a positive polarity and the second magnet 636 is described herein as an electromagnet (hereinafter referred to as the electromagnet 636). However, it will be apparent to one of ordinary skill in the art that the first magnet 634 may be an electromagnet while the second magnet 636 is a conventional magnet. Further, both the first and second magnets 634, 636 may be electromagnets. The electromagnet 636 is constructed of a coil of wire arranged in a relatively flat structure as known in the art, and is configured to generate a magnetic field when activated through the application of an electrical current. Further, in this embodiment, the polarity of the electromagnet 636 may be switched or changed by controlling the direction of the applied electrical current. Thus, when electrical current is applied in a first direction, the electromagnet 636 is configured to have a negative polarity so that the electromagnet 636 and the first magnet 634 are attracted to each other as shown in FIG. 6A. Conversely, when electrical current is applied in a second or opposite direction, the electromagnet 636 is configured to have a positive polarity so that the electromagnet 636 and the first magnet 634 repel each other as shown in FIG. 6B.

In another embodiment hereof, both the first and second magnets 634, 636 may be programmable magnets. Programmable magnets include a plurality of magnetic elements of various strength and polarity on a single substrate, as opposed to a conventional magnet that has a singular polarity and strength. When a pair of programmable magnets opposes or faces each other such that the magnetic elements thereon oppose or face each other, the corresponding opposing magnetic elements form pre-programmed correlated patterns designed to achieve a desired behavior. The programmable behavior is achieved by creating multipole structures comprising multiple magnetic elements of varying size, location, orientation, and saturation. Thus, programmable magnets are programmable in the sense that the magnetic strength and polarity of each individual magnetic element is designed or selected in order to achieve a desired behavior. However, the programmable aspect or nature of the magnet is complete after the programmable magnet is formed with a plurality of magnetic elements of various strength and polarity, and thus the programmable magnets may be considered to be "one-time" programmable magnets. Programmable magnets are commercially available from Correlated Magnetics Research LLC of Huntsville, Ala. The first and second magnets 634, 636 may be programmed to attract and repel each other at the same time with a programmed force or strength. By programming different magnetic elements to have different strengths and direction of poles at different parts of the magnet, the first and second magnets 634, 636 are suspended relative to each other in the configuration of FIG. 6B. Stated another way, the first and second magnets 634, 636 may be programmed such that the first and second magnets 634, 636 float or hover a controlled or programmed spaced-apart distance from each other in a nominal configuration. In order to selectively attract or repel each other as described above for simulating touching a virtual object, at least one of the programmable magnets is a programmable electromagnet.

FIG. 6C illustrates another embodiment of a wearable device 600C that includes the wearable housing 116 and an actuator 620C. In this embodiment, the wearable housing 116 is a single layer of material having the inner surface 130 and the outer surface 132 (i.e., the liner 631 is not required). A first magnet 634C and a second magnet 636C are secured to the inner surface 130 of the wearable housing 116. In another embodiment hereof, the first magnet 634C and/or the second magnet 636C may be secured to the outer surface 132 of the wearable housing 116. The first magnet 634C is secured to a first surface of the first digit segment 118A that is configured for contact with a dorsal side of a finger of a wearer and the second magnet 636C is secured to a second surface of the first digit segment 118A that is configured for contact with a ventral side of a finger of a wearer. When the first and second magnets 634C, 636C are of opposite polarities and thus attract each other, the first and second magnets 634C, 636C essentially squeeze the finger of the wearer to simulate touching a virtual object. When the first and second magnets 634C, 636C are of the same polarity and thus repel each other, the first and second magnets 634C, 636C do not squeeze the finger of the wearer and thus do not simulate touching a virtual object.

In another embodiment hereof illustrated in FIGS. 7A and 7B, a wearable device 700 includes the wearable housing 116 and an actuator 720 that is configured to simulate touching a virtual object. In this embodiment, the wearable housing 116 is a single layer of material having the inner surface 130 and the outer surface 132. The actuator 720 is secured to the first digit segment 118A of the wearable housing 116. The actuator 720 is secured to the inner surface 130 of the wearable housing 116. In another embodiment hereof, the actuator 720 may be secured to the outer surface 132 of the wearable housing 116. The actuator 720 is a segment 737 of smart material that is deformable in response to a command signal from the host processor 108 and/or the local processor 112. In FIG. 7A, the segment 737 is shown in a first configuration in which the segment of smart material is not deformed, thereby simulating not touching a virtual object. In FIG. 7B, the segment 737 is shown in a second configuration in which the segment of smart material is deformed to arc or move outward from the wearable housing 116, thereby simulating touching a virtual object. Smart materials have the property of exhibiting a change in size, shape, or stiffness when subjected to an electrical charge or electric field. Stated another way, smart materials may be configured to exhibit mechanical deformation when an electrical charge is exerted on them. Opposing ends of the segment 737 are bonded via adhesive or otherwise coupled to the inner surface 130 of the wearable housing 116. In this embodiment, the segment 737 is secured to the inner surface 130 of the wearable housing 116 and is arranged such that the segment 737 contacts a ventral side of a finger of a wearer when deformed. In an embodiment hereof, the smart material of the segment 737 is formed from a piezoelectric material, a macro fiber composite (MFC) material, an electroactive polymer (EAP), or a similar material to those previously listed. When an electrical charge is applied to the segment 737, the segment 737 deforms and bends as shown in FIG. 7B towards the finger of a wearer such that a force is applied to the wearer's skin. Smart materials can be made very thin and small, thereby allowing their use in the wearable device 100.

In order to apply an electrical charge to the actuator 720, the host processor 108 and/or the local processor 112 includes control hardware and software that provide electric signals to the segment 737 causing the segment 737 to deform and exert the desired force to produce haptic feedback or effects to a wearer. More particularly, a power source (not shown) supplies an electrical charge to the segment 737. The power source may be located within the wearable device 100 or the host computer 102. For example, the power source may be a flexible, thin battery that is integrated into the wearable housing 116 of the wearable device 700. The host processor 108 and/or the local processor 112 controls the power source and thus determines the magnitude and frequency of the applied electrical charge. Accordingly, the power source is configured to receive a command signal from the host processor 108 and/or the local processor 112 and is configured to apply an electrical charge to the segment 737 in accordance with the command signal. The segment 737 deforms or bends in response to the applied electrical charge from the power source. The haptic effect applied by the segment 737 may be considered a deformation haptic effect felt by the wearer. Examples of deformation haptic effects that simulate touching a virtual object include a single relatively large deformation, fast impacts or collisions, hard surface textures, or fast moving objects. Additional examples of deformation haptic effects include multiple relatively small deformations that may simulate, for example, virtual touching soft impacts like raindrops, soft surface textures, or slow moving virtual objects in your hand in a virtual reality environment.

FIG. 7C illustrates another embodiment of a wearable device 700C that includes the wearable housing 116 and an actuator 720C. In this embodiment, the actuator 720C is a ring or annular band 737C that is secured to the first digit segment 118A of the wearable housing 116 such that the annular band 737C surrounds or encircles a finger of the wearer. When the annular band 737C deforms, it essentially squeezes the finger of the wearer to simulate touching a virtual object or a virtual character/avatar touching the user.

Figure 8:
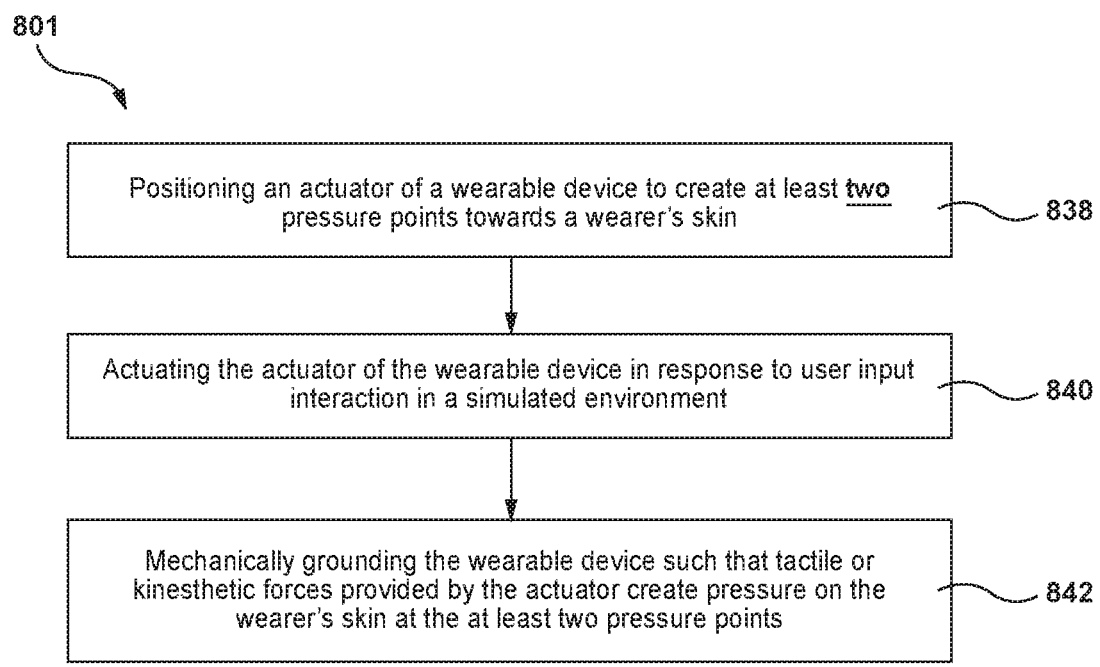
FIG. 8 is a flow chart that depicts providing a haptic effect indicative of a virtual interaction related to grasping a virtual object with a wearable device in accordance with an embodiment hereof.

FIG. 8 is a flow chart depicting a process 801 for providing a haptic effect indicative of a virtual interaction related to grasping a virtual object with a wearable device in accordance herewith. The wearable device 100, via actuator 120, is configured to provide tactile force feedback to the wearer thereof by providing a resistance force that makes it difficult for a wearer to bend a hand disposed inside the wearable device 100 and thereby simulates grasping a virtual object. When simulating grasping a virtual object, the actuator 120 is configured to and positioned on the wearable housing 116 so as to create at least two pressure points onto or towards the wearer's skin at a fingertip, thumb, or other portion of the hand as shown in step 838. Such actuation of the actuator 120 is triggered or applied in response to grasping a virtual object in a simulated environment such as a virtual reality environment or an augmented reality environment as shown in step 840. The actuator 120 provides pressure toward a wearer's skin that represents a tactile characteristic of the grasped virtual object such as a size, a shape or a compliance/stiffness of the grasped virtual object. More particularly, the host processor 108 of the host computer 102 and/or the local processor 112 of the wearable device 100 is configured to output a command signal to the actuator 120 in response to grasping a virtual object in a virtual reality or augmented reality environment. The actuator 120 includes circuitry that receives signals from the host processor 108 and/or the local processor 112 of the wearable device 100. The actuator 120 may also include any circuitry required to convert the command signal from the processor(s) to an appropriate signal for use with the actuator 120. The actuator 120 provides a force onto the portion of the hand in response to the command signal to provide haptic feedback to a wearer of the wearable device 100. Such haptic feedback allows for a more intuitive, engaging, and natural experience for the wearer of the wearable device 100. When simulating grasping a virtual object, the tactile or kinesthetic forces rendered by the actuator 120 toward the wearer's skin create pressure on the wearer's skin at the at least two pressure point as shown in step 842. Such tactile or kinesthetic forces may be perceived or felt by the wearer due to the fact that the wearable housing 116 is mechanically stabilize as described above.

Figure 9:
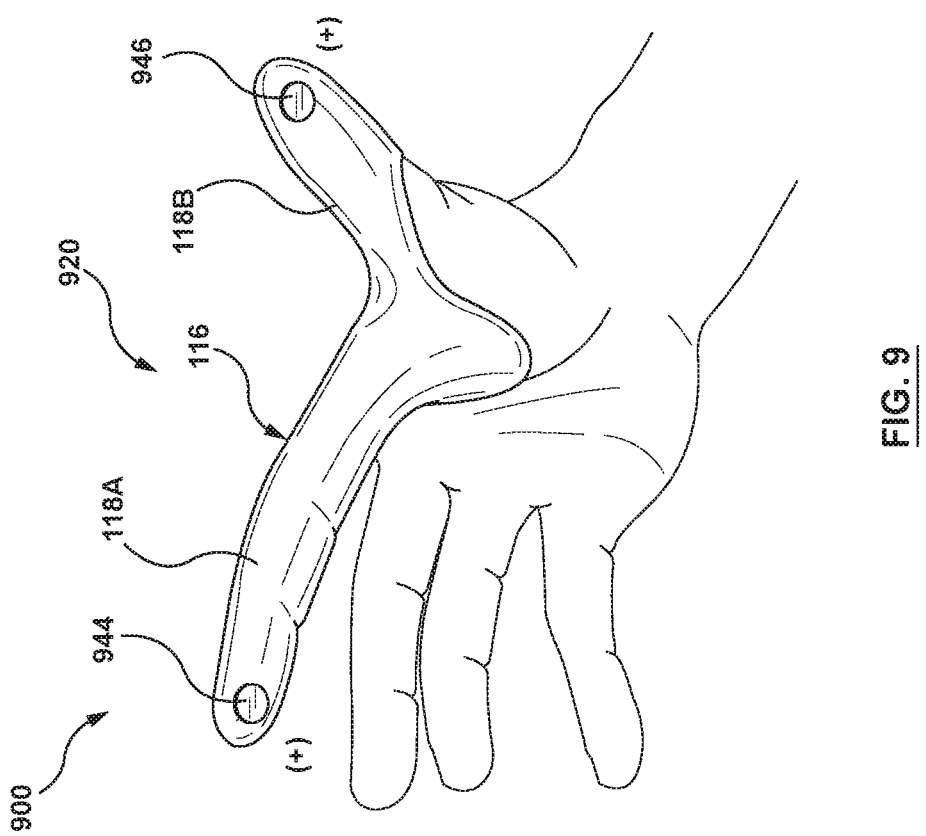
FIG. 9 is a schematic illustration of a wearable device according to an embodiment hereof, wherein an actuator includes a first magnet secured to the first digit segment of the wearable device and a second magnet secured to the second digit segment of the wearable device, the first magnet and the second magnet being configured to repel each other in response to a command signal.

In an embodiment hereof illustrated in FIG. 9, a wearable device 900 includes the wearable housing 116 and an actuator 920. The actuator 920 is configured to simulate grasping a virtual object and includes a first magnet 944 and a second magnet 946. In this embodiment, the first magnet 944 is secured to the first digit segment 118A of the wearable housing 116 and the second magnet 946 is secured to the second digit segment 118B of the wearable housing 116. In FIG. 9, the first and second magnets 944, 946 are shown in a first configuration in which they are of the same polarities and thus repel each other, thereby simulating grasping a virtual object. When a wearer attempts to bend his finger or thumb, or move his finger and thumb towards each other, the magnetic force between the first and second magnets 944, 946 pushes back, causing pressure at the wearer's fingertips that are disposed adjacent to the first and second magnets 944, 946. Although both the first and second magnets 944, 946 are shown with positive charges, it will be apparent to one of ordinary skill in the art that the magnets may alternatively both have negative charges to similarly repel each other.

In order to selectively repel each other as described above to simulate grasping a virtual object, at least one of the first magnet 944 and the second magnet 946 is an electromagnet. For sake of illustration purposes, the first magnet 944 is described herein as a conventional magnet having a positive polarity and the second magnet 946 is described herein as an electromagnet (hereinafter referred to as the electromagnet 946). However, it will be apparent to one of ordinary skill in the art that the first magnet 944 may be an electromagnet while the second magnet 946 is a conventional magnet. Further, both the first and second magnets 944, 946 may be electromagnets. The electromagnet 946 is constructed of a coil of wire arranged in a relatively flat structure as known in the art, and is configured to generate a magnetic field when activated through the application of an electrical current. Thus, when electrical current is applied in the current example, the electromagnet 946 is configured to have a positive polarity so that the electromagnet 946 and the first magnet 944 repel each other as shown in FIG. 9. When the electromagnet 946 is activated, the actuator 920 thus provides a force, in response to the command signal, to render a resistance to movement of the first digit segment 118A toward the second digit segment 118B, and vice versa. The resistance to relative movement between the first and second digit segments 118A, 118B is essentially a resistance to bending of each of the wearer's fingers respectively disposed within each of the first and second digit segments 118A, 118B and thereby simulates grasping a virtual object. For example, when a wearer grasps a virtual object in a virtual reality or augmented reality environment, the electromagnet 946 is activated and prevents or impedes a wearer's fingers from bending, thereby causing a sensation of a grasping pressure for those fingers that are prevented from further movement. When the electromagnet 946 is not activated, the actuator 920 provides no resistance to relative movement between the first digit segment 118A and the second digit segment 118B.

As previously stated, the electromagnet 946 is configured to generate a magnetic field when activated through the application of an electrical current. This magnetic field may be programmatically controlled via host processor 108 and/or the local processor 112. For example, it may be desirable to pulse the magnetic field in order to create different patterns of haptics effects. For example, a pulsed magnetic field may be used to simulate the example of a wearer grasping and crushing a virtual object such as a can in a virtual reality or augmented reality environment.

Figure 10A:
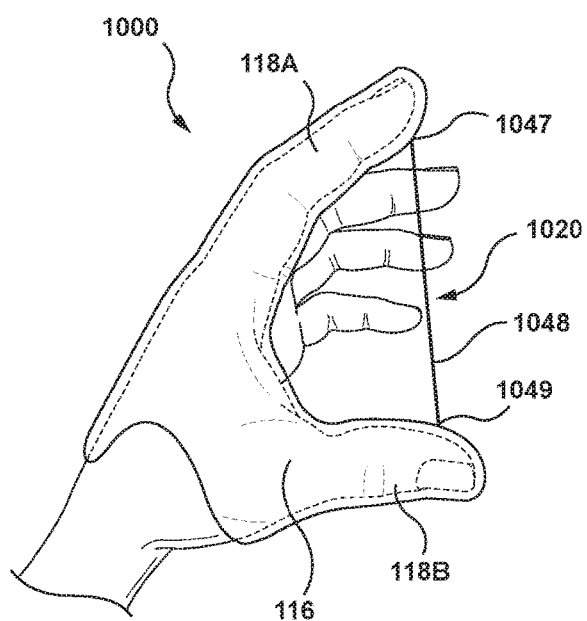
FIG. 10A is a schematic illustration of a wearable device according to an embodiment hereof, wherein an actuator extends exterior to the wearable device and includes a strand having a first end secured to the first digit segment of the wearable device and a second opposing end secured to the second digit segment of the wearable device, the strand being shown in a first configuration in which the strand renders a resistance to movement of the first digit segment toward the second digit segment, and vice versa.
Figure 10B:
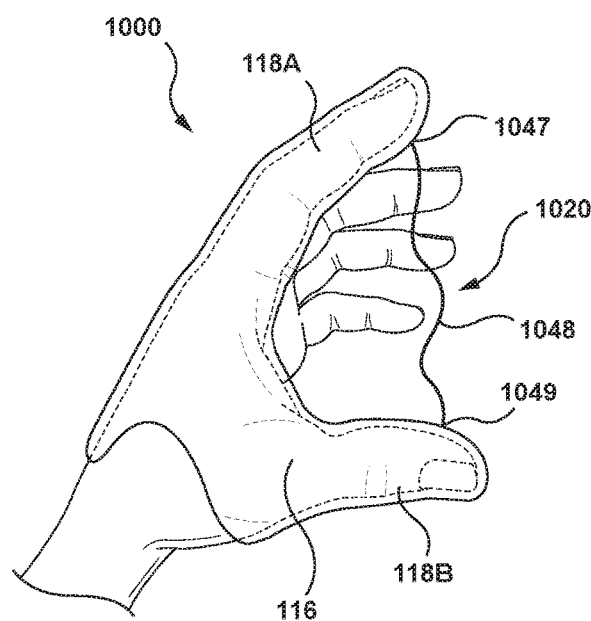
FIG. 10B is another schematic illustration of the wearable device according to the embodiment of FIG. 10A, wherein the strand is shown in a second configuration in which the strand does not render a resistance to movement of the first digit segment toward the second digit segment, and vice versa.

In another embodiment hereof illustrated in FIGS. 10A and 10B, a wearable device 1000 includes the wearable housing 116 and an actuator 1020 that is configured to simulate grasping a virtual object. The actuator 1020 extends exterior to the wearable housing 116 and includes a strand 1048 having a first end 1047 secured to the first digit segment 118A of the wearable housing 116 and a second opposing end 1049 secured to the second digit segment 118B of the wearable housing 116. The strand 1048 is formed from a smart material that is deformable in response to a command signal for the host processor 108 and/or the local processor 112. In FIG. 10A, the strand 1048 of the wearable device 1000 is shown in a first configuration in which the strand 1048 renders a resistance to movement of the first digit segment 118A toward the second digit segment 118B, and vice versa, thereby simulating grasping a virtual object. In FIG. 10B, the strand 1048 is shown in a second configuration in which the strand 1048 does not render a resistance to movement of the first digit segment 118A toward the second digit segment 118B, and vice versa, thereby not simulating grasping a virtual object. Smart materials have the property of exhibiting a change in size, shape, and/or stiffness when subjected to an electrical charge or electric field. In an embodiment hereof, the actuator 1020 is formed from an electroactive polymer (EAP), a shape memory polymer (SMP), a shape memory alloy (SMA), or a combination of a shape memory polymer (SMP) and a shape memory alloy (SMA). In order to alternate between the first and second configurations described above with respect to FIG. 10A and FIG. 10B, a stiffness of the strand 1048 may be controlled or varied. More particularly, the strand 1048 in the second configuration of FIG. 10B has a second stiffness when no electrical charge is applied thereto. In the second configuration of FIG. 10B, the strand 1048 is malleable or limp like a string and does not render a resistance to movement of the first digit segment 118A toward the second digit segment 118B, and vice versa. When subjected to an electrical charge or electric field, a stiffness of the strand 1048 changes to a first stiffness which is greater than second stiffness. The strand 1048 in the first configuration of FIG. 10A has the first stiffness. In the first configuration of FIG. 10A, the strand 1048 is rigid or unbendable and renders a resistance to movement of the first digit segment 118A toward the second digit segment 118B, and vice versa. Further, in this embodiment, the strand 1048 is generally straight or linear when in the first configuration of FIG. 10A.

In order to apply an electrical charge to the actuator 1020, the host processor 108 and/or the local processor 112 includes control hardware and software that provide electric signals to the actuator 1020 causing the actuator 1020 to deform and exert the desired force to produce haptic feedback or effects to a wearer. More particularly, a power source (not shown) supplies an electrical charge to the actuator 1020. The power source may be located within the wearable device 1000 or the host computer 102. For example, the power source may be a flexible, thin battery that is integrated into the wearable housing 116 of the wearable device 1000. The host processor 108 and/or the local processor 112 controls the power source and thus determines the magnitude and frequency of the applied electrical charge. Accordingly, the power source is configured to receive a command signal from the host processor 108 and/or the local processor 112 and is configured to apply an electrical charge to the actuator 1020 in accordance with the command signal. A stiffness of the actuator 1020 increases in response to the applied electrical charge from the power source, and provides a force that renders a resistance to movement of the first digit segment 118A toward the second digit segment 118B, and vice versa. The resistance to relative movement between the first and second digit segments 118A, 118B provides a resistance to bending of the wearer's fingers respectively disposed within the first and second digit segments 118A, 118B and thereby simulates grasping a virtual object. When no electrical charge is applied thereto, the strand 1048 is limp and provides no resistance to relative movement between the first digit segment 118A and the second digit segment 118B. For example, when a wearer grasps a virtual object in a virtual reality or augmented reality environment, an electrical charge is applied to the strand 1048 and the stiffness of the strand 1048 increases, thereby causing a sensation of a grasping pressure for those fingers that are prevented from further movement.

In another embodiment hereof, in order to alternate between the first and second configurations described above with respect to FIG. 10A and FIG. 10B, a length of the strand 1048 may be controlled or varied. More particularly, the strand 1048 in the second configuration of FIG. 10B has a second or longer length which permits more movement of the first digit segment 118A toward the second digit segment 118B, and vice versa. The strand 1048 in the first configuration of FIG. 10A has the first or shorter length which permits less movement of the first digit segment 118A toward the second digit segment 118B, and vice versa. The length of the strand 1048 may be varied by winding the strand 1048 around a bidirectional DC motor (not shown) that may be integrated into the wearable device 1000. Winding the strand 1048 in a first direction reduces the length of the strand 1048, and unwinding the strand 1048 in a second opposing direction increases the length of the strand 1048.

Figure 11A:
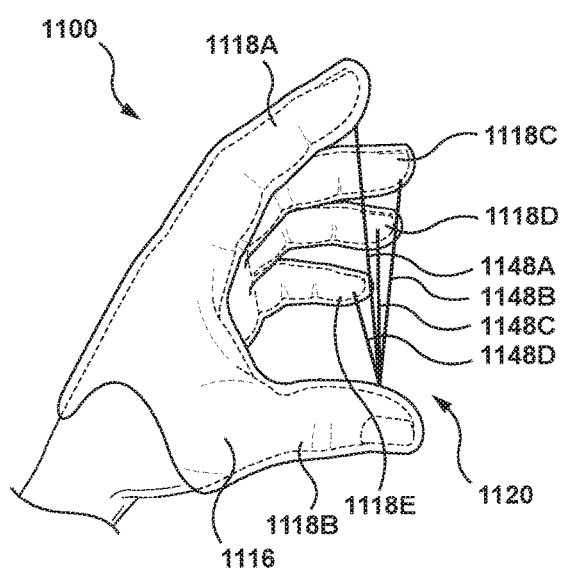
FIG. 11A is a schematic illustration of a wearable device in accordance with an embodiment hereof, wherein an actuator extends exterior to the wearable device and includes a plurality of strands, the strands being shown in a first configuration in which the strands render a resistance to movement.
Figure 11B:
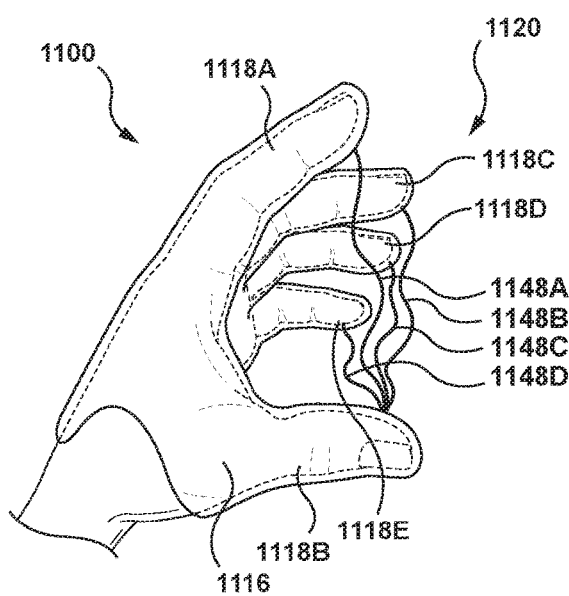
FIG. 11B is another schematic illustration of the wearable device according to the embodiment of FIG. 11A, wherein the strands are shown in a second configuration in which the strands do not render a resistance to movement.

Although FIGS. 10A and 10B illustrate the actuator 1020 with only a single strand 1048, the actuator may include a plurality of strands as depicted by an actuator 1120 of a wearable device 1100 shown in FIGS. 11A and 11B. In this embodiment, the wearable device 1100 includes a wearable housing 1116 with five digit segments in total that resembles a traditional glove. More particularly, the actuator 1120 is disposed exterior to the wearable housing 1116 and includes four strands 1148A, 1148B, 1148C, and 1148D. Similar to the strand 1048 described above, each strand 1148A, 1148B, 1148C, 1148D is formed from a smart material that is deformable in response to a command signal from the host processor 108 and/or the local processor 112. The strand 1148A has a first end secured to a first digit segment 1118A of the wearable housing 1116 and a second opposing end secured to a second digit segment 1118B of the wearable housing 1116. The strand 1148B has a first end secured to a third digit segment 1118C of the wearable housing 1116 and a second opposing end secured to the second digit segment 1118B of the wearable housing 1116. The strand 1148C has a first end secured to a fourth digit segment 1118D of the wearable housing 1116 and a second opposing end secured to the second digit segment 1118B of the wearable housing 1116. The strand 1148D has a first end secured to a fifth digit segment 1118E of the wearable housing 1116 and a second opposing end secured to the second digit segment 1118B of the wearable housing 1116. In another embodiment hereof (not shown), strands 1148A, 1148B, 1148C, and 1148D may each have second opposing ends that are secured to another portion of the wearable housing 1116 or a palm of a wearer rather than the second digit segment 1118B.

Strands 1148A, 1148B, 1148C, 1148D, as illustrated in the second configuration of the wearable device 1100 shown in FIG. 11B, each have a second stiffness when no electrical charge is applied thereto. In the second configuration shown in FIG. 11B, each strand 1148A, 1148B, 1148C, 1148D is pliable or limp like a string and does not render a resistance to movement of each of the first digit segment 1118A, the third digit segment 1118C, the fourth digit segment 1118D, and the fifth digit segment 1118E, respectively, toward the second digit segment 1118B, and vice versa. When subjected to an electrical charge or electric field, a stiffness of each strand 1148A, 1148B, 1148C, 1148D changes to a first stiffness which is greater than second stiffness. Each strand 1148A, 1148B, 1148C, 1148D in the first configuration shown in FIG. 11A has the first stiffness. In the first configuration shown in FIG. 11A, each strand 1148A, 1148B, 1148C, 1148D is rigid and renders a resistance to movement of each of the first digit segment 1118A, the third digit segment 1118C, the fourth digit segment 1118D, and the fifth digit segment 1118E, respectively, toward the second digit segment 1118B, and vice versa. Although depicted with four strands, the actuator 1120 may include a greater or lesser number of strands.

Figure 12A:
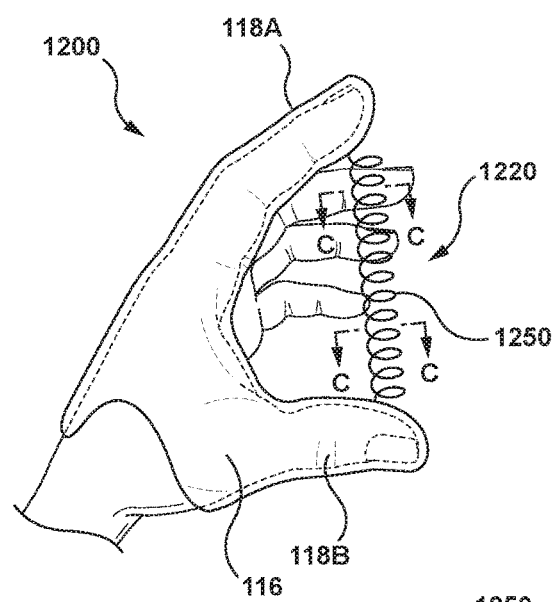
FIG. 12A is a schematic illustration of a wearable device according to an embodiment hereof, wherein an actuator extends exterior to the wearable device and includes a coil having a first end secured to a first digit segment of the wearable device and a second opposing end secured to a second digit segment of the wearable device, the coil being shown in a first configuration in which the coil renders a resistance to movement of the first digit segment toward the second digit segment, and vice versa.
Figure 12B:
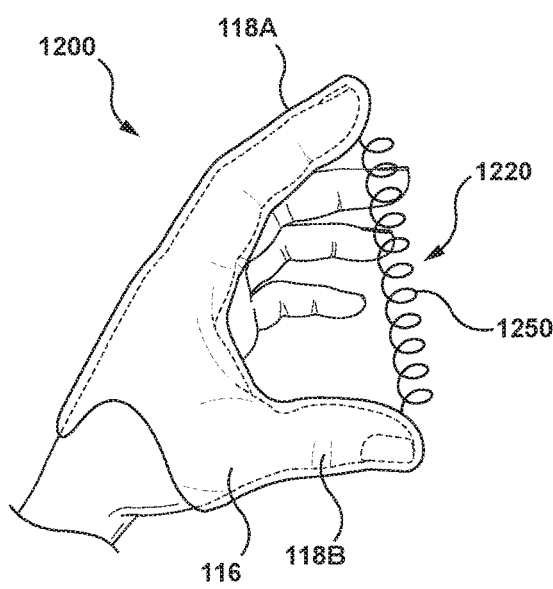
FIG. 12B is another schematic illustration of the wearable device according to the embodiment of FIG. 12A, wherein the coil is shown in a second configuration in which the coil does not render a resistance to movement of the first digit segment toward the second digit segment, and vice versa.
Figure 12C:
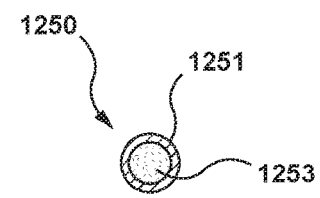
FIG. 12C is a cross-sectional view taken along line C-C of FIG. 12A.

Although actuators 1020, 1120 include strand(s) formed from a smart material, an actuator according to another embodiment hereof includes a coil rather than a strand. More particularly, FIGS. 12A and 12B illustrate a wearable device 1200 that includes the wearable housing 116 and an actuator 1220. The actuator 1220 extends exterior to the wearable housing 116 and includes a coil 1250 having a first end secured to the first digit segment 118A of the wearable housing 116 and a second opposing end secured to the second digit segment 118B of the wearable housing 116. In FIG. 12A, the coil 1250 is shown in a first configuration in which the coil 1250 renders a resistance to movement of the first digit segment 118A toward the second digit segment 118B, and vice versa, thereby simulating grasping a virtual object. In FIG. 12B, the coil 1250 is shown in a second configuration in which the coil 1250 does not render a resistance to movement of the first digit segment 118A toward the second digit segment 118B, and vice versa, thereby not simulating grasping a virtual object. More particularly, as best shown in FIG. 12C which is a cross-sectional view of the component that forms the coil 1250 taken along line C-C of FIG. 12A, the coil 1250 includes a shell 1251 and a smart material 1253 disposed within the shell 1251. The smart material 1253 is deformable in response to a command signal from the host processor 108 and/or the local processor 112. In an embodiment, the smart material 1253 is a metal which has a liquid state when no electrical charge is applied thereto and a solid state when an electrical charge is applied thereto. For example, the smart material 1253 may be a so-called "liquid metal" or a combination of a pure metal with an alloy, or other suitable materials such as a wax or gel material with a low melting point such that the material becomes soft above a specific temperature (i.e., a softening or melting point). The smart material 1253 of the coil 1250 is in the liquid state (with no electrical charge applied thereto) when the coil 1250 is in the second configuration of FIG. 12B. In the second configuration of FIG. 12B, the coil 1250 is malleable or pliable and does not render a resistance to movement of the first digit segment 118A toward the second digit segment 118B, and vice versa. When subjected to an electrical charge or electric field, the smart material 1253 of the coil 1250 is in the solid state when the coil 1250 is in the first configuration of FIG. 12A. In the first configuration of FIG. 12A, the coil 1250 is rigid and renders a resistance to movement of the first digit segment 118A toward the second digit segment 118B, and vice versa. The shell 1251 and the smart material 1253 of this embodiment may also be utilized as materials for the strand 1048 described in FIGS. 10A and 10B above.

Figure 13A:
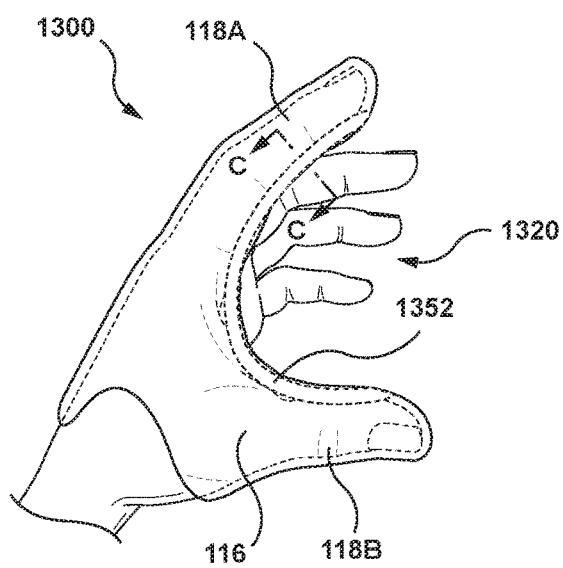
FIG. 13A is a schematic illustration of a wearable device according to an embodiment hereof, wherein an actuator extends interior to the wearable device and includes an elongated member that conforms to a first digit segment of the wearable device and a second digit segment of the wearable device, the elongated member being shown in a first configuration in which the elongated member renders a resistance to movement of the first digit segment toward the second digit segment, and vice versa.
Figure 13B:
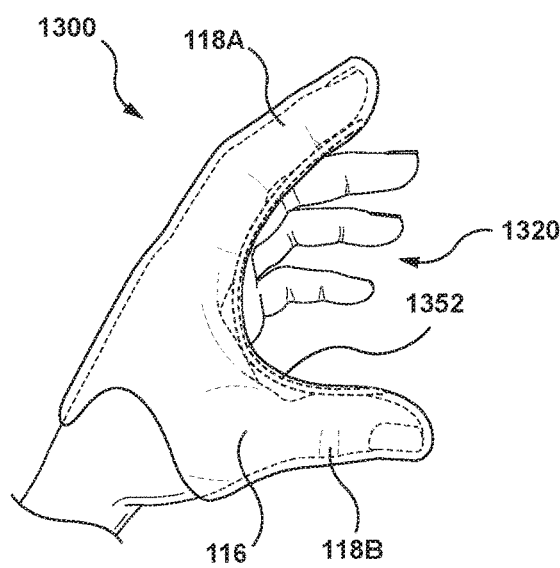
FIG. 13B is another schematic illustration of the wearable device according to the embodiment of FIG. 13A, wherein the elongated member is shown in a second configuration in which the elongated member does not render a resistance to movement of the first digit segment toward the second digit segment, and vice versa.
Figure 13C:
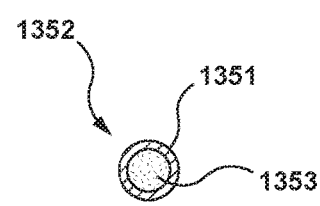
FIG. 13C is a cross-sectional view taken along line C-C of FIG. 13A.

In another embodiment hereof illustrated in FIGS. 13A and 13B, a wearable device 1300 includes the wearable housing 116 and an actuator 1320 that extends interior to the wearable housing 116 and includes an elongated member 1352. The elongated member 1352 is a curved component that conforms to and extends along or adjacent to the first digit segment 118A of the wearable housing 116 and the second digit segment 118B of the wearable housing 116. In an embodiment hereof, the elongated member 1352 has a C-shaped configuration. Further, in another embodiment hereof (not shown), the elongated member 1352 may alternatively be secured to the exterior to the wearable housing 116. In FIG. 13A, the elongated member 1352 is shown in a first configuration in which the elongated member renders a resistance to movement of the first digit segment 118A toward the second digit segment 118B, and vice versa, thereby simulating grasping a virtual object. In FIG. 13B, the elongated member 1352 is shown in a second configuration in which the elongated member 1352 does not render a resistance to movement of the first digit segment 118A toward the second digit segment 118B, and vice versa, thereby not simulating grasping a virtual object. More particularly, as best shown in FIG. 13C which is a cross-sectional view of the elongated member 1352 taken along line C-C of FIG. 13A, the elongated member 1352 includes a shell 1351 and a smart material 1353 that is deformable in response to a command signal from the host processor 108 and/or the local processor 112 is disposed within the shell 1351. In an embodiment, the smart material 1353 is a metal which has a liquid state when no electrical charge is applied thereto and a solid state when an electrical charge is applied thereto. For example, the smart material 1253 may be a so-called "liquid metal" or a combination of a pure metal with an alloy, or other suitable materials such as a wax or gel material with a low melting point such that the material becomes soft above a specific temperature (i.e., a softening or melting point). The smart material 1353 of the elongated member 1352 is in the liquid state (with no electrical charge applied thereto) when the elongated member 1352 is in the second configuration of FIG. 13B. In the second configuration of FIG. 13B, the elongated member 1352 is malleable or pliable and does not render a resistance to movement of the first digit segment 118A toward the second digit segment 118B, and vice versa. When subjected to an electrical charge or electric field, the smart material 1353 of the elongated member 1352 is in the solid state when the elongated member 1352 is in the first configuration of FIG. 13A. In the first configuration of FIG. 13A, the elongated member 1352 is rigid and renders a resistance to movement of the first digit segment 118A toward the second digit segment 118B, and vice versa.

In another embodiment, rather than including the shell 1351 with the metal disposed therein, the elongated member 1352 may be formed from a smart material that is deformable in response to a command signal for the host processor 108 and/or the local processor 112. As described above with respect to the strand 1048 of the actuator 1020, smart materials have the property of exhibiting a change in size, shape, and/or stiffness when subjected to an electrical charge or electric field. In an embodiment hereof, the elongated member 1352 is formed from an electroactive polymer (EAP), a shape memory polymer (SMP), a shape memory alloy (SMA), a combination of a shape memory polymer (SMP) and a shape memory alloy (SMA), piezoceramics, a dielectric elastomer (silicon, acrylic or synthetic/natural rubber based) or Polyvinylidene fluoride and its copolymer or terpolymer derivatives. In order to alternate between the first and second configurations described above with respect to FIG. 13A and FIG. 13B, a stiffness and/or thickness of the elongated member 1352 may be controlled or varied. More particularly, the elongated member 1352 in the second configuration of FIG. 13B has a second stiffness and/or a second thickness when no electrical charge is applied thereto. In the second configuration of FIG. 13B, the elongated member 1352 is pliable or limp and does not render a resistance to movement of the first digit segment 118A toward the second digit segment 118B, and vice versa. When subjected to an electrical charge or electric field, a stiffness of the elongated member 1352 changes to a first stiffness which is greater than second stiffness and/or a thickness of the elongated member 1352 changes to a first thickness which is greater than second thickness. In the first configuration of FIG. 13A, the elongated member 1352 is rigid (due to increased stiffness and/or greater thickness) and renders a resistance to movement of the first digit segment 118A toward the second digit segment 118B, and vice versa.

In the embodiment of FIGS. 13A and 13B, the smart material of the actuator 1320 extends the full length of the elongated member 1352. However, in another embodiment hereof, the smart material may be selectively disposed within an elongated member so that the smart material is disposed adjacent to joints of a wearer's hand. More particularly, FIG. 14 illustrates an embodiment of a wearable device 1400 that includes the wearable housing 116 and an actuator 1420 having an elongated member 1452. The elongated member 1452 is a curved component that conforms to and extends along or adjacent to the first digit segment 118A of the wearable housing 116 and the second digit segment 118B of the wearable housing 116. In an embodiment hereof, the elongated member 1452 has a C-shaped configuration. As best shown in FIG. 14B which is a sectional view of the elongated member 1452 (the elongated member 1452 is shown removed from the wearable housing 116 for illustrative purposes only), the elongated member 1452 includes a shell 1451 with a plurality of interior compartments 1454A, 1454B. The plurality of interior compartments 1454A, 1454B are adjacent sections or areas along the length of the elongated member 1452 within the shell 1451. A smart material 1453 that is deformable in response to a command signal for the host processor 108 and/or the local processor 112 is disposed only in those interior compartments 1454A that are positioned on the wearable housing 116 so as to be disposed adjacent to joints of a wearer's hand. The number and size/length of the interior compartments 1454A may vary from the configuration shown in FIG. 14. The smart material 1453 may be a metal which has a liquid state when no electrical charge is applied thereto and a solid state when an electrical charge is applied thereto, or may be formed of a smart material that exhibits a change in size, shape, and/or stiffness when subjected to an electrical charge or electric field such as an electroactive polymer (EAP), a shape memory polymer (SMP), a shape memory alloy (SMA), a combination of a shape memory polymer (SMP) and a shape memory alloy (SMA), piezoceramics, a dielectric elastomer (silicon, acrylic or synthetic/natural rubber based) or polyvinylidene fluoride and its copolymer or terpolymer derivatives. The remaining interior compartments 1454B (which are not adjacent to joints of the hand) may be filled with a stiff material such as plastic, metal, carbon fiber, or the like such that the when the smart material 1453 is stiff, the entire length of the elongated member 1452 is similarly stiff.

FIGS. 15-16B are schematic illustrations of a wearable device 1500 for providing haptic effects according to another embodiment hereof. Wearable device 1500 includes a wearable housing 1516. The wearable housing 1516 includes at least a first digit segment 1518A and a second digit segment 1518B. In this embodiment, unlike wearable housing 116, the first and second digit segments 1518A, 1518B are not configured to surround or encircle at least a portion of each of the finger and thumb, respectively, of the hand. Rather, the first and second digit segments 1518A, 1518B are planar segments that conform to a ventral surface of each of the finger and thumb, respectively. More particularly, the first digit segment 1518A is configured to conform to a ventral surface of a finger of the wearer's hand while the second digit segment 1518A is configured to confirm to a ventral surface of a thumb of the wearer's hand. In another embodiment, the first and second digit segments 1518A, 1518B are also configured to conform to one or more sides of the wearer's finger and thumb. The wearable housing 1516 further includes an anchor 1522. Similar to the anchor 122, the anchor 1522 is disposed between the first digit segment 1518A and the second digit segment 1518B. The anchor 1522 includes a ventral flap 1522A and a dorsal flap 1522B such that anchor 1522 is configured to extend from a dorsal side of the hand to a ventral side of the hand. More particularly, the ventral flap 1522A is configured to be disposed over a portion of the ventral surface of the wearer's hand and the dorsal flap 1522B is configured to be disposed over a portion of the dorsal surface of the wearer's hand. The anchor 1522 functions to mechanically stabilize the wearable housing 1516 relative to the hand of the wearer as described in more detail above with respect to the anchor 122. As shown on FIG. 16A, the anchor 1522 may include rows 1658 of a stiffening material embedded in a material of the wearable housing 1516 to relatively increase the stiffness of the anchor 1522 relative to the first and second digit segments 1518A, 1518B.

The wearable housing 1516 is formed from any suitable material that is configured to conform to a wearer's hand. The wearable housing 1516 is a single layer of material that has an inner surface 1530 and an outer surface 1532. The inner surface 1530 is configured to contact the skin of a wearer and conform thereto. In an embodiment, as shown on FIG. 16B, the inner surface 1530 may include a layer of an elastic polymer material 1655 such as but not limited to silicone polymer so as to provide the inner surface 1530 with tackiness and ensure a relatively high degree of friction between the wearable housing 1516 and the skin of the wearer.

The outer surface 1532 is configured to be spaced apart from the skin of a wearer's hand. An actuator 1520 may be secured onto or embedded into the outer surface 1532 as shown on FIG. 16A. The actuator 1520 is configured to render a resistance to movement of the first digit segment 1518A toward the second digit segment 1518B, and vice versa. More particularly, the actuator 1520 includes rows 1656 of a smart material that extend along the first and second digit segments 1518A, 1518B. The smart material is deformable in response to a command signal for the host processor 108 and/or the local processor 112, and a stiffness of the smart material may be controlled or varied. In an embodiment hereof, the actuator 1520 is formed from an electroactive polymer (EAP), a shape memory polymer (SMP), a shape memory alloy (SMA), a combination of a shape memory polymer (SMP) and a shape memory alloy (SMA). More particularly, the rows 1656 of smart material have a second stiffness when no electrical charge is applied thereto such that a wearer may move or bend the first and second digit segments 1518A, 1518B towards each other. When subjected to an electrical charge or electric field, a stiffness of the rows 1656 of smart material changes to a first stiffness which is greater than second stiffness such that a wearer cannot move or bend the first and second digit segments 1518A, 1518B towards each other.

A sensing system may be integrated into the wearable device 100, or another embodiment of a wearable device described herein, for capturing parameters for later playback as haptic feedback. More particularly, in addition to providing haptic feedback, the wearable device 100 may also be configured to evaluate, estimate, approximate, or otherwise assess a physical characteristic of a real-world object which corresponds to a virtual object. Further, the assessed physical characteristic may be used to provide a haptic effect indicative of a virtual interaction with the virtual object. At least one sensor 115 (see FIG. 2) is secured to or embedded into the wearable housing 116 for measuring or sensing dynamic responses to user interactions with a real-world object. The measured or sensed dynamic responses are characterized as parameters and such parameters are replayed as haptic feedback to replicate the feel of the real-world object when touching and/or grasping a virtual object that corresponds to the real-world object. The parameters that are obtained via measured or sensed dynamic responses of the real-world object may be considered a three-dimensional haptic object map that may be applied to a virtual object in a virtual reality or augmented reality environment that corresponds to the real-world object. The three-dimensional haptic object map may be stored in the memory 110 of the host computer 102 and/or the local memory 114 of the wearable device 100, and the actuator 120 of wearable device may be utilized to play back the parameters of the three-dimensional haptic object map as haptic feedback.

Examples of sensors 115 that may be embedded within or secured to the wearable housing 116 include sensors that can sense three-dimensional position, orientation and force values during interactions with real objects. Examples of suitable sensors for use herein include capacitive sensors, resistive sensors, surface acoustic wave sensors, optical sensors (e.g., an array of light sensors for a shadow-based sensor that detects position by measuring ambient-light shadows produced by external objects), or other suitable sensors. Each sensor 115 of the wearable housing 116 is electrically connected to the host processor 108 and/or the local processor 112 to convey or transmit its corresponding sensor signal to the host processor 108 and/or the local processor 112. Signals from the sensor(s) 115 are received and processed by the host processor 108 and/or the local processor 112 in order to generate the three-dimensional haptic object map for later use as haptic feedback by the actuator 120 as described above. In an embodiment hereof, the host processor 108 and/or the local processor 112 may include a calibration module to calibrate signals coming from the sensors 115 to be a standardized signal. Architectures and control methods that can be used for reading sensor signals and providing haptic feedback for a device are described in greater detail in U.S. Pat. No. 5,734,373 to Rosenberg et al., assigned to the same assignee of the present invention and the disclosures of which is herein incorporated by reference in its entirety.

Figure 17:
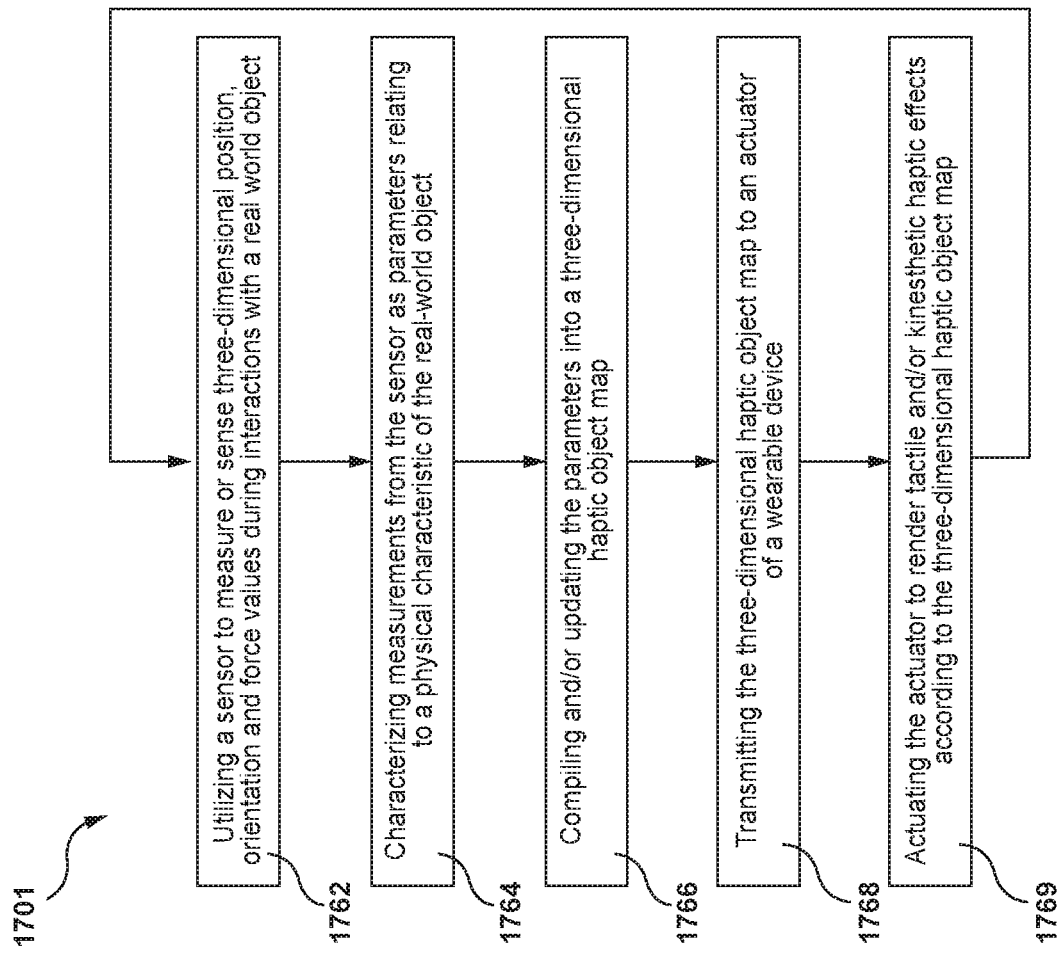
FIG. 17 is a flow chart that depicts sensing a dynamic response to a user interaction with a real-world object which corresponds to a virtual object, and using the dynamic response to assess a physical characteristic of the real-world object and to provide a haptic effect indicative of a virtual interaction with the virtual object with a wearable device in accordance with an embodiment hereof.

FIG. 17 is a flow chart depicting a process 1701 for sensing a dynamic response to a user interaction with a real-world object which corresponds to a virtual object, and using the dynamic response to assess a physical characteristic of the real-world object and to provide a haptic effect indicative of a virtual interaction with the virtual object with a wearable device in accordance with an embodiment hereof. The sensor 115 is utilized to measure or sense three-dimensional position, orientation and force values during user interactions with a real-world object as shown in step 1762. The host processor 108 and/or the local processor 112 receives the measured or sensed dynamic responses from the sensor 115 and characterizes the measurements as parameters relating to a physical characteristic of the real-world object as shown in step 1764. The physical characteristic may be a size, a shape, a stiffness, a weight, a thermal feature, or a texture of the real-world object. The host processor 108 and/or the local processor 112 compile and/or update the parameters into a three-dimensional haptic object map as shown in step 1766. The host processor 108 and/or the local processor 112 transmit the three-dimensional haptic object map to the actuator 120 of the wearable device 100 as shown in step 1768, and the actuator 120 renders tactile and/or kinesthetic haptic effects according to the three-dimensional haptic object map as shown in step 1769. The three-dimensional haptic object map may be continuously updated by the host processor 108 and/or the local processor 112 with new measured or sensed dynamic responses from the sensor 115.

FIG. 18 is a schematic illustration of the wearable device 100 being shown in close proximity to a real-world object, which is depicted as a ball 1870. The wearable device 100 includes the sensor 115 embedded into the wearable housing 116 for measuring or sensing dynamic responses to the wearer's interactions with the ball 1870. The host processor 108 and/or the local processor 112 then characterize the measured or sensed dynamic responses as parameters and such parameters are replayed as haptic feedback to replicate the feel of the ball 1870 when the wearer touches and/or grasps a virtual object that corresponds to the ball 1870. Stated another way, the host processor 108 and/or the local processor 112 create a three-dimensional haptic object map of the ball 1870 to be played back as a set of haptic playback parameters. The parameters relate to at least one physical characteristic of the ball 1870, such as a size, a shape, a stiffness, and/or or a texture of the ball 1870. In an example hereof, a user may pick up the ball 1870 with a hand having the wearable device 100 thereon. The user may interact with the ball 1870 in a variety of ways including but not limited to touching it, holding it, or applying pressure to it. As the user interacts with the ball 1870, the sensor(s) of the wearable device 100 measure or sense dynamic responses to user interactions with the ball 1870 in order to assess at least one physical characteristic of the ball 1870.

In another example, the real-world object is a piece of material or fabric. A user is a knitwear designer who is making a custom dress for a customer. The customer brings a dress that she already owns to show the knitwear designer the properties of the fabric that she would like the custom dress to incorporate. While wearing the wearable device 100, the knitwear designer grasps the fabric of the customer's dress and feels the texture, stretch and other physical properties thereof. The host processor 108 and/or the local processor 112 builds a physical model of the fabric. The knitwear designer renders a new garment design using the physical model of the fabric captured by the sensor(s) of the wearable device 100.

FIG. 19 is a schematic illustration of two wearable devices 100 being shown in close proximity to a real-world object, which is depicted as a box 1980. Wearable devices 100 each include the sensor 115 embedded into the wearable housing 116 thereof for measuring or sensing dynamic responses to the wearer's interactions with the box 1980. The host processor 108 and/or the local processor 112 then characterizes the measured or sensed dynamic responses as parameters and such parameters are replayed as haptic feedback to replicate the feel of the box 1980 when touching and/or grasping a virtual object that corresponds to the box 1980. The parameters relate to at least one physical characteristic of the box 1980, such as a size, a shape, a stiffness, a weight, a thermal feature, and/or or a texture of the box 1980. With two wearable devices 100, the sensors 115 thereof can collectively be utilized to assess the physical characteristic of the box 1980. For example, with two wearable devices 100, certain physical characteristics of the box 1980 such as but not limited to the size and shape may be assessed. Notably, using two wearable devices 100 may more correctly assess a size and shape of relatively larger real-world objects (i.e., real-world objects that cannot fit into a single hand of a user).

Although actuators for simulating touch of a virtual object and actuators for simulating grasping of a virtual object are separately described herein, multiple types of actuators may be included on the same the wearable device 100. Thus, a single wearable device 100 may include both an actuator for simulating touch of a virtual object and an actuator for simulating grasping of a virtual object. Further, the wearable device 100 may further include additional actuators that provide other types of haptic feedback such as vibration, temperature, pressure, friction, and the like. Stated another way, actuators for simulating touch of a virtual object and actuators for simulating grasping of a virtual object as described herein may be combined with other actuation methods that create tactile feedback either in the same wearable device or in a secondary peripheral device.

Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A wearable device for providing haptic effects, comprising:
   a wearable housing configured to be worn on no more than three digits of a hand of a wearer, wherein the wearable housing includes
      a first digit segment configured to conform to a finger of the hand and a second digit segment configured to conform to another finger or a thumb of the hand, and
      an anchor disposed to extend between the first digit segment and the second digit segment, the anchor being saddle shaped to extend from a dorsal side to a ventral side of the hand; and
   an actuator secured to the wearable housing and configured to
      receive a command signal indicative of a virtual interaction related to grasping a virtual object, and
      provide a force, in response to the command signal, to render a resistance to movement of the first digit segment of the wearable housing toward the second digit segment of the wearable housing, and vice versa, wherein the actuator uses the anchor of the wearable housing to mechanically stabilize the force towards the hand.

2. The wearable device of claim 1, wherein the anchor of the wearable housing includes a ventral flap configured to be disposed over a portion of a ventral surface of the hand and a dorsal flap configured to be disposed over a portion of a dorsal surface of the hand.

3. The wearable device of claim 2, wherein the anchor mechanically stabilizes the wearable housing relative to the hand by conforming to the hand.

4. The wearable device of claim 1, wherein the actuator is formed from a smart material and a stiffness of the actuator is varied to provide the force in response to the command signal.

5. The wearable device of claim 4, wherein the actuator extends exterior to the wearable housing and includes at least one strand or coil having a first end secured to the first digit segment of the wearable housing and a second opposing end secured to the second digit segment of the wearable housing.

6. The wearable device of claim 5, wherein the at least one strand or coil of the actuator includes
   a first strand formed from a smart material that is deformable in response to the command signal, the first strand having the first end secured to the first digit segment of the wearable housing and the second opposing end secured to the second digit segment of the wearable housing, and
   a second strand formed from a smart material that is deformable in response to the command signal, the second strand having a first end secured to a third digit segment of the wearable housing and a second opposing end secured to the second digit segment of the wearable housing.

7. The wearable device of claim 5, wherein the actuator includes a shell and the smart material is a metal disposed within the shell, the metal having a liquid state and a solid state in response to the command signal.

8. The wearable device of claim 4, wherein the actuator extends interior to the wearable housing and conforms to the first digit segment of the wearable housing and the second digit segment of the wearable housing.

9. The wearable device of claim 8, wherein the actuator includes a shell and the smart material is a metal disposed within the shell, the metal having a liquid state and a solid state in response to the command signal.

10. The wearable device of claim 9, wherein the shell includes a plurality of interior compartments and the smart material is disposed only in interior compartments of the plurality of interior compartments that are positioned to be disposed adjacent to joints of the hand.

11. The wearable device of claim 1, further comprising:
at least one sensor secured to the wearable housing and configured to sense a dynamic response to a user interaction with a real-world object, wherein the dynamic response is used to assess a physical characteristic of the real-world object which corresponds to the virtual object, the physical characteristic being at least one of a size, a shape, a stiffness, a weight, a thermal feature, or a texture of the real-world object, and
wherein the virtual interaction is a tactile characteristic of the virtual object, the tactile characteristic being at least one of a size, a shape, a stiffness, a weight, a thermal feature, or a texture of the virtual object and corresponding to the physical characteristic of the real-world object.

12. The wearable device of claim 1, wherein each of the first digit segment and the second digit segment is a tubular component with a closed tip end and having an end that is disposed at the anchor.

13. The wearable device of claim 1, wherein the wearable housing is configured to be worn on only two digits of the hand, the first digit segment being configured to conform to the finger of the hand and the second digit segment being configured to conform to the thumb of the hand.

14. A system for providing haptic effects, comprising:
a first wearable housing configured to be worn on a portion of a first hand of a wearer, wherein the first wearable housing includes a first digit segment configured to conform to a finger of the first hand, a second digit segment configured to conform to another finger or a thumb of the first hand, and an anchor disposed to extend between the first and second digit segments of the first wearable housing;
a first sensor secured to the first wearable housing;
a second wearable housing configured to conform to a portion of a second hand of the wearer, wherein the second wearable housing includes a first digit segment configured to conform to a finger of the second hand and a second digit segment configured to conform to another finger or a thumb of the second hand;
a second sensor secured to the second wearable housing, wherein the first sensor and the second sensor are configured to collectively sense a dynamic response to a user interaction with a real-world object, wherein the dynamic response is used to assess a physical characteristic of the real-world object, the physical characteristic being at least one of a size, a shape, a stiffness, a weight, a thermal feature, or a texture of the real-world object; and
an actuator secured to the first wearable housing, the actuator being configured to
receive a command signal indicative of a virtual interaction related to grasping a virtual object that corresponds to the real-world object, and
provide a force, in response to the command signal, to render a resistance to movement of the first digit segment of the first wearable housing toward the second digit segment of the first wearable housing, wherein the actuator uses the anchor to mechanically stabilize the force towards the first hand.

15. A wearable device for providing haptic effects, comprising:
a wearable housing configured to be worn on no more than three digits of a hand of a wearer, wherein the wearable housing includes
a first digit segment configured to conform to a finger of the hand and a second digit segment configured to conform to another finger or a thumb of the hand, and
an anchor disposed to extend between the first digit segment and the second digit segment, the anchor being saddle shaped to extend from a dorsal side of the hand to a ventral side of the hand; and
an actuator secured to the wearable housing and configured to
receive a command signal indicative of a virtual interaction related to touching a virtual object, and
provide a force onto the portion of the hand in response to the command signal, wherein the actuator uses the anchor of the wearable housing to mechanically stabilize the force towards the hand.

16. The wearable device of claim 15, wherein the actuator is secured to at least one the first digit segment or the second digit segment of the wearable housing.

17. The wearable device of claim 16, wherein the actuator includes a smart material that is deformable in response to the command signal.

18. The wearable device of claim 17, wherein the actuator is secured to a portion of the first digit segment configured to contact a ventral side of the finger of the wearer.

19. The wearable device of claim 17, wherein the actuator is secured to the first digit segment such that the actuator surrounds the finger of the wearer.

20. The wearable device of claim 15, wherein the wearable housing is configured to be worn on only two digits of the hand, the first digit segment being configured to conform to the finger of the hand and the second digit segment being configured to conform to the thumb of the hand.

* * * * *